(12) United States Patent
Yuan et al.

(10) Patent No.: US 10,832,652 B2
(45) Date of Patent: Nov. 10, 2020

(54) MODEL GENERATING METHOD, AND SPEECH SYNTHESIS METHOD AND APPARATUS

(71) Applicant: TENCENT TECHNOLOGY (SHENZHEN) COMPANY LIMITED, Guangdong (CN)

(72) Inventors: Haolei Yuan, Shenzhen (CN); Fuzhang Wu, Shenzhen (CN); Binghua Qian, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 105 days.

(21) Appl. No.: 16/318,889

(22) PCT Filed: Aug. 14, 2017

(86) PCT No.: PCT/CN2017/097314
§ 371 (c)(1),
(2) Date: Jan. 18, 2019

(87) PCT Pub. No.: WO2018/072543
PCT Pub. Date: Apr. 26, 2018

(65) Prior Publication Data
US 2019/0189109 A1 Jun. 20, 2019

(30) Foreign Application Priority Data
Oct. 17, 2016 (CN) .......................... 2016 1 0901099

(51) Int. Cl.
*G10L 13/00* (2006.01)
*G10L 13/06* (2013.01)
(Continued)

(52) U.S. Cl.
CPC ............ *G10L 13/047* (2013.01); *G06F 17/16* (2013.01); *G10L 13/06* (2013.01); *G10L 13/08* (2013.01)

(58) Field of Classification Search
CPC ................................. G10L 13/06; G10L 13/07
See application file for complete search history.

(56) References Cited

U.S. PATENT DOCUMENTS 6,366,883 B1  4/2002  Campbell et al.
8,571,871 B1 * 10/2013  Stuttle .................. G10L 13/033
                                                    704/260
(Continued)

FOREIGN PATENT DOCUMENTS

CN        1787072 A      6/2006
CN      101004909 A      7/2007
(Continued)

OTHER PUBLICATIONS

Ling, Zhen-Hua, and Ren-Hua Wang. "Minimum unit selection error training for HMM-based unit selection speech synthesis system." 2008 IEEE International Conference on Acoustics, Speech and Signal Processing. IEEE, 2008. (Year: 2008).*
(Continued)

*Primary Examiner* — Jialong He
(74) *Attorney, Agent, or Firm* — Sughrue Mion, PLLC

(57) ABSTRACT

A method is performed by at least one processor, and includes acquiring training speech data by concatenating speech segments having a lowest target cost among candidate concatenation solutions, and extracting training speech segments of a first annotation type, from the training speech data, the first annotation type being used for annotating that a speech continuity of a respective one of the training speech segments is superior to a preset condition. The method further includes calculating a mean dissimilarity matrix, based on neighboring candidate speech segments corre-
(Continued)

sponding to the training speech segments before concatenation, the mean dissimilarity matrix representing a mean dissimilarity in acoustic features of groups of the neighboring candidate speech segments belonging to a same type of concatenation combination relationship, and generating a concatenation cost model having a target concatenation weight, based on the mean dissimilarity matrix, the concatenation cost model corresponding to the same type of concatenation combination relationship.

20 Claims, 15 Drawing Sheets

(51) Int. Cl.
  *G10L 13/047* (2013.01)
  *G10L 13/08* (2013.01)
  *G06F 17/16* (2006.01)

(56) References Cited

U.S. PATENT DOCUMENTS

| | | | | |
|---|---|---|---|---|
| 9,082,401 | B1* | 7/2015 | Fructuoso | G10L 13/08 |
| 2008/0027727 | A1 | 1/2008 | Morita et al. | |
| 2009/0048841 | A1* | 2/2009 | Pollet | G10L 13/07 |
| | | | | 704/260 |
| 2009/0070115 | A1* | 3/2009 | Tachibana | G10L 13/10 |
| | | | | 704/260 |
| 2016/0140953 | A1 | 5/2016 | Kwon | |
| 2016/0300564 | A1* | 10/2016 | Nasu | G10L 13/10 |
| 2017/0162186 | A1* | 6/2017 | Tamura | G10L 13/08 |

FOREIGN PATENT DOCUMENTS

| | | |
|---|---|---|
| CN | 101131818 A | 2/2008 |
| CN | 103531196 A | 1/2014 |
| CN | 104112444 A | 10/2014 |
| CN | 104575488 A | 4/2015 |
| CN | 105654940 A | 6/2016 |
| CN | 106356052 A | 1/2017 |

OTHER PUBLICATIONS

Hunt, Andrew J., and Alan W. Black. "Unit selection in a concatenative speech synthesis system using a large speech database." 1996 IEEE International Conference on Acoustics, Speech, and Signal Processing Conference Proceedings. vol. 1. IEEE, 1996. (Year: 1996).*

Ann K. Syrdal et al., "Data-Driven Perceptually Based Join Costs," 5th ISCA Speech Synthesis Workshop—Pittsburgh, Jun. 16, 2014, pp. 49-54.

Ann K. Syrdal et al., "Perceptually-based Data-driven Join Costs: Comparing Join Types," INTERSPEECH 2005, Dec. 31, 2005, pp. 2813-2816.

Chinese Office Action issued in CN 2016109010991.1 dated Nov. 26, 2018.

International Search Report of PCT/CN2017/097314 dated Nov. 16, 2017.

* cited by examiner

MODEL GENERATING METHOD, AND SPEECH SYNTHESIS METHOD AND APPARATUS

CROSS-REFERENCE TO RELATED APPLICATIONS

This application is a U.S. national stage application under 35 U.S.C. § 371 of International Patent Application No. PCT/CN2017/097314 filed Aug. 14, 2017, which claims priority from Chinese Patent Application No. 201610901099.1, entitled "Speech Synthesis Method and Apparatus" and filed on Oct. 17, 2016, in the Chinese Patent Office, which is incorporated herein by reference in their entireties.

FIELD

1. Field

Methods and apparatus consistent with example embodiments relate to the technical field of speech synthesis, and in particular to a model generating method, and a speech synthesis method and apparatus.

2. Description of Related Art

Speech synthesis technologies are also known as text to speech technologies, used for converting text information to speech information. A current speech synthesis technology used widely is a speech synthesis technology based on waveform concatenation.

The core concept of the speech synthesis technology based on waveform concatenation is: pre-constructing a corpus, the corpus including various speech segments; and selecting, for input text information, a plurality of appropriate speech segments from the corpus to be concatenated into final speech information. For known text information $W=(w_1, w_2, \ldots, w_n)$, $w_i$ is a text primitive, and a target speech segment sequence $V=(v_1, v_2, \ldots, v_n)$ having a lowest total cost is selected from a corpus by using a target cost and a concatenation cost to perform speech synthesis, $v_1$ being a speech segment. The target cost is used for representing a similarity between a predicted acoustic feature corresponding to the text primitive $w_i$ and an acoustic feature of a candidate speech segment in the corpus, and as the target cost is lower, the two acoustic features are more similar; and the concatenation cost is used for representing a continuity between neighboring candidate speech segments after concatenation, and as the concatenation cost is lower, the continuity effect of concatenated speeches is superior.

For example, for known text information "Good Morning China," a text primitive "Good Morning" is corresponding to three candidate speech segments a in a corpus, a text primitive "China" is corresponding to two candidate speech segments b in the corpus, and there are six candidate concatenation solutions. A target cost is used for representing a similarity between a predicted acoustic feature corresponding to the text primitive "Good Morning" and the candidate speech segment a and representing a similarity between a predicted acoustic feature corresponding to the text primitive "China" and the candidate speech segment b. A concatenation cost is used for representing a continuity between the candidate speech segment a and the candidate speech segment b. For the six candidate concatenation solutions, the respective target cost and concatenation cost of each candidate concatenation solution are calculated, a candidate concatenation solution having a lowest total cost is selected as a final concatenation solution, and final speech information is obtained by synthesis.

A complete concatenation cost model consists of an algorithm model and weights. To obtain a superior continuity effect, these weights are manually adjusted according to the experience of a designer as well as trial and error. After a concatenation cost model having an initial weight performs speech synthesis on input text information, the continuity effect of speech information needs to be tested by artificial audiometry. If a dissatisfactory continuity effect is obtained, these weights in the concatenation cost model need to be manually adjusted. The concatenation cost model having the adjusted weights is used to perform speech synthesis on the input text information again and to repeat the foregoing process on synthesized speech information again until a satisfactory continuity effect is obtained.

Every time these weights are manually adjusted, speech synthesis needs to be performed again, and artificial audiometry needs to be performed on the continuity effect of the synthesized speech information. However, the continuity effect obtained after each adjustment is not always superior to a previous continuity effect, and superior weights and a satisfactory continuity effect can be usually obtained by performing artificial audiometry and manual adjustment for many times. Even so, weights obtained finally are still not accurate enough.

SUMMARY

According to embodiments, a method is performed by at least one processor, and includes acquiring training speech data by concatenating speech segments having a lowest target cost among candidate concatenation solutions, and extracting training speech segments of a first annotation type, from the training speech data, the first annotation type being used for annotating that a speech continuity of a respective one of the training speech segments is superior to a preset condition. The method further includes calculating a mean dissimilarity matrix, based on neighboring candidate speech segments corresponding to the training speech segments before concatenation, the mean dissimilarity matrix representing a mean dissimilarity in acoustic features of groups of the neighboring candidate speech segments belonging to a same type of concatenation combination relationship, and generating a concatenation cost model having a target concatenation weight, based on the mean dissimilarity matrix, the concatenation cost model corresponding to the same type of concatenation combination relationship.

According to embodiments, an apparatus includes at least one memory configured to store computer program code, and at least one processor configured to access the at least one memory and operate according to the computer program code. The computer program code includes acquiring code configured to cause the at least one processor to acquire training speech data by concatenating speech segments having a lowest target cost among candidate concatenation solutions, and extraction code configured to cause the at least one processor to extract training speech segments of a first annotation type, from the training speech data, the first annotation type being used for annotating that a speech continuity of a respective one of the training speech segments is superior to a preset condition. The computer program code further includes first calculation code configured to cause the at least one processor to calculate a mean dissimilarity matrix, based on neighboring candidate speech segments corresponding to the training speech segments before concatenation, the mean dissimilarity matrix representing a mean dissimilarity in acoustic features of groups of the neighboring candidate speech segments belonging to a same type of concatenation combination relationship, and generation code configured to cause the at least one processor to generate a concatenation cost model having a target concatenation weigh, based on the mean dissimilarity matrix, the concatenation cost model corresponding to the same type of concatenation combination relationship.

According to embodiments, a non-transitory computer-readable storage medium stores instructions that cause a processor to acquire training speech data by concatenating speech segments having a lowest target cost among candidate concatenation solutions, and extract training speech segments of a first annotation type, from the training speech data, the first annotation type being used for annotating that a speech continuity of a respective one of the training speech segments is superior to a preset condition. The instructions further cause the processor to calculate a mean dissimilarity matrix, based on neighboring candidate speech segments corresponding to the training speech segments before concatenation, the mean dissimilarity matrix representing a mean dissimilarity in acoustic features of groups of the neighboring candidate speech segments belonging to a same type of concatenation combination relationship, and generate a concatenation cost model having a target concatenation weight, based on the mean dissimilarity matrix, the concatenation cost model corresponding to the same type of concatenation combination relationship.

DESCRIPTION OF EMBODIMENTS

Figure 1A:
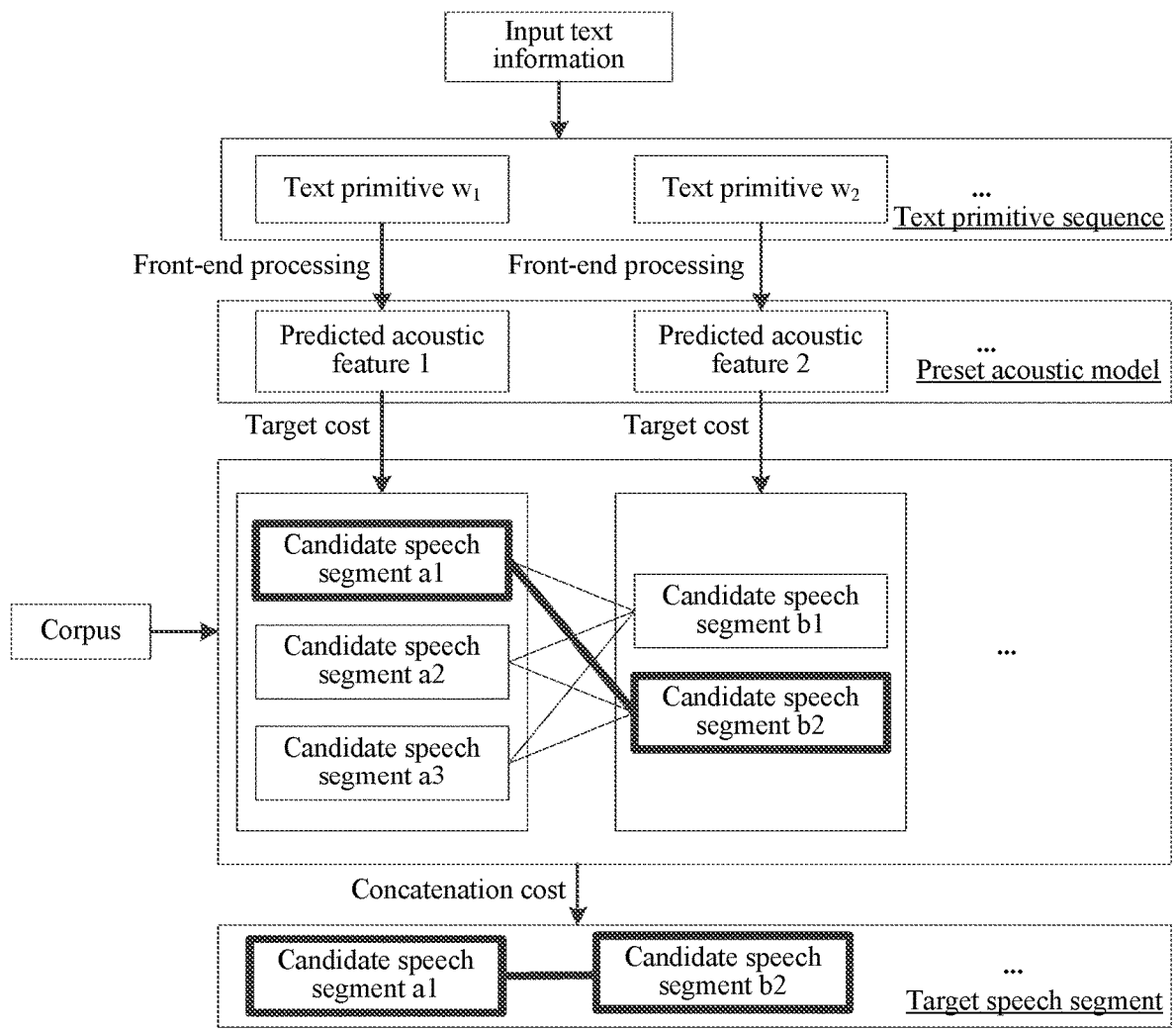
FIG. 1A is a schematic diagram of a speech synthesis method based on waveform concatenation.

To make the objectives, technical solutions, and advantages of the disclosure clearer, the following further describes implementations in detail with reference to the accompanying drawings.

First, some terms involved in the embodiments are explained:

Text primitive sequence: a group of text primitive sequences (w1, w2, . . . , wn) is obtained by splitting input text information, wherein wi is the i-th text primitive, $1 \leq i \leq n$, and i and n are positive integers.

Target cost: it is used for representing a similarity between a predicted acoustic feature corresponding to the text primitive wi and an acoustic feature of a candidate speech segment, wherein as the target cost is lower, the two acoustic features are more similar.

Optionally, the predicted acoustic feature is expressed by an acoustic parameter value corresponding to the text primitive wi, or the predicted acoustic feature is expressed by a probability model corresponding to the text primitive wi. The predicted acoustic feature is any one or any combination of fundamental frequency and spectrum features, a first-order change rate and high-order change rate of a fundamental frequency, a first-order change rate and high-order change rate of a spectrum, signal energy, or a signal zero-crossing rate.

Optionally, the candidate speech segments are a plurality of speech segments stored in a corpus.

Concatenation cost: it is used for representing a continuity between neighboring candidate speech segments.

Training speech data: it is speech data obtained by concatenating speech segments having a lowest target cost.

The training speech data is to-be-trained speech information associated with the target cost and unassociated with the concatenation cost. That is, in a speech synthesis process of the training speech data, the impact of the target cost instead of the concatenation cost (it is assumed that the concatenation cost is zero) is taken into consideration. In this embodiment, it is assumed that the concatenation cost is zero in a concatenation process of a model generating method. That is, the impact of the concatenation cost on the speech synthesis process is not taken into consideration.

Optionally, the training speech data includes at least one training speech segment, one training speech segment being a training speech segment obtained by concatenating a first candidate speech segment and a second candidate speech segment.

Annotation type of training speech segment: it includes a first annotation type and a second annotation type. The first annotation type is used for annotating a training speech segment having a speech continuity superior to a preset condition, namely, the training speech segment having a better speech continuity effect. The second annotation type is used for annotating a training speech segment having a speech continuity inferior to a preset condition, namely, the training speech segment having a poorer speech continuity effect.

Optionally, the annotation type of each training speech segment is obtained by annotation after artificial audiometry. If an artificial audiometry result is that the continuity of this training speech segment is superior, this training speech segment is annotated as a first annotation type. If an artificial audiometry result is that the continuity of this training speech segment is inferior, this training speech segment is annotated as a second annotation type. The speech continuity corresponding to the first annotation type is superior to the speech continuity corresponding to the second annotation type.

Mean dissimilarity matrix: it is used for representing a mean dissimilarity in acoustic features of a plurality of groups of neighboring candidate speech segments belonging to a same type of concatenation combination relationship, wherein the mean dissimilarity matrix is corresponding to one type of concatenation combination relationship.

Because one training speech segment is obtained by concatenating a first candidate speech segment and a second candidate speech segment, a concatenation dissimilarity matrix of the first candidate speech segment and the second candidate speech segment can be obtained through a dissimilarity in acoustic features of the first candidate speech segment and the second candidate speech segment. A mean of the concatenation dissimilarity matrices belonging to a same type of concatenation combination relationship is calculated, to obtain a mean dissimilarity matrix corresponding to this type of concatenation combination relationship.

Optionally, if a speech segment is divided by phonemes, the concatenation combination relationship includes a combination relationship between at least two phonemes. Illustratively, the concatenation combination relationship is a combination relationship formed by the fact that phoneme units a precede phoneme units b.

For example, a combination relationship formed between a phonetic alphabet "y" and a phonetic alphabet "i" is a concatenation combination relationship.

Concatenation cost model: it is a concatenation cost model having a target concatenation weight, wherein the concatenation cost model is corresponding to one type of concatenation combination relationship.

Wherein, the target concatenation weight includes a first weight and a second weight. The first weight is a weight corresponding to an n-th acoustic feature in two concatenated candidate speech segments, and the second weight is a second weight corresponding to an acoustic feature of the t-th overlapping frame in two candidate speech segments.

Before a model generating method and a speech synthesis method according to the embodiments are introduced, a speech synthesis process based on waveform concatenation in the related art is introduced first.

FIG. 1A shows a schematic diagram of a speech synthesis method based on waveform concatenation.

A user inputs text information to a server, the server splits the input text information to obtain a group of text primitive sequences (w1, w2, ..., wn), and the server finally converts, by virtue of a series of steps, this group of text primitive sequences to a group of text primitive sequences (v1, v2, ..., vn) to perform speech synthesis to obtain speech information corresponding to the input text information. Detailed description is made by taking two text primitives neighboring successively, namely a text primitive w1 and a text primitive w2, as an example. The server performs front-end processing on the text primitive w1 and the text primitive w2 according to a preset acoustic model, to obtain a predicated acoustic feature 1 corresponding to the text primitive w1 and a predicated acoustic feature 2 corresponding to the text primitive w2 respectively. For the predicated acoustic feature 1 corresponding to the text primitive w1, three first candidate speech segments are selected from a corpus, the three first candidate speech segments including a candidate speech segment a1, a candidate speech segment a2 and a candidate speech segment a3. For the predicated acoustic feature 2 corresponding to the text primitive w2, two second candidate speech segments are selected from the corpus, the two second candidate speech segments including a candidate speech segment b1 and a candidate speech segment b2.

When the three first candidate speech segments and the two second candidate speech segments are concatenated, there are six candidate concatenation solutions, as shown in Table 1. The first candidate concatenation solution is to concatenate the candidate speech segment a1 and the candidate speech segment b1. The second candidate concatenation solution is to concatenate the candidate speech segment a2 and the candidate speech segment b1. The third candidate concatenation solution is to concatenate the candidate speech segment a3 and the candidate speech segment b1. The fourth candidate concatenation solution is to concatenate the candidate speech segment a1 and the candidate speech segment b2. The fifth candidate concatenation solution is to concatenate the candidate speech segment a2 and the candidate speech segment b2. The sixth candidate concatenation solution is to concatenate the candidate speech segment a3 and the candidate speech segment b2. Wherein, for the first candidate concatenation solution, the server calculates, according to a target cost model, a first target cost TC11 between the text primitive w1 and the corresponding candidate speech segment a1, and a second target cost TC50 between the text primitive w2 and the corresponding candidate speech segment b1, and calculates, according to a concatenation cost model, a concatenation cost CC11 between the candidate speech segment a1 and the candidate speech segment b1, and a total cost RC1 corresponding to the first candidate concatenation solution, the total cost RC1 including the first target cost TC11, the second target cost TC50 and the first concatenation cost CC11. By parity of reasoning, a total cost RC2 corresponding to the second candidate concatenation solution, a total cost RC3 corresponding to the third candidate concatenation solution, a total cost RC4 corresponding to the fourth candidate concatenation solution, a total cost RC5 corresponding to the fifth candidate concatenation solution, and a total cost RC6 corresponding to the sixth candidate concatenation solution are calculated respectively. The server compares the total costs corresponding to these six candidate concatenation solutions, a comparison result is that the total cost RC2 corresponding to the second candidate concatenation solution is lowest, that is, it is determined that the candidate speech segment a1 and the candidate speech segment b2 belong to target speech segments, final speech concatenation is performed, and a final synthesized speech is obtained.

TABLE 1

| Candidate speech segment | First target cost | Second candidate speech segment | Second target cost | Concatenation cost | Total cost |
|---|---|---|---|---|---|
| Candidate speech segment a1 | TC11 | Candidate speech segment b1 | TC50 | CC11 | RC1 |
| Candidate speech segment a2 | TC21 | | | CC21 | RC2 |
| Candidate speech segment a3 | TC31 | | | CC31 | RC3 |
| Candidate speech segment a1 | TC12 | Candidate speech segment b2 | TC60 | CC12 | RC4 |
| Candidate speech segment a2 | TC22 | | | CC22 | RC5 |
| Candidate speech segment a3 | TC32 | | | CC32 | RC6 |

In this embodiment, by taking the foregoing fourth candidate concatenation solution of concatenating the candidate speech segment a1 and the candidate speech segment b2 as an example, the concatenation cost model may be defined based on the following formula:

$$CC = \sum_{t'=1}^{T} w_{t'} \cdot \left(\sum_{n=1}^{N} w_n \cdot |\Delta f|\right)$$

$$= \sum_{t=t_0}^{t_0+T-1} w_t \cdot \left(\sum_{n=1}^{N} w_n \cdot |f_{a,t} - f_{b,t-T+1}|\right)$$

$$= w_n^T \cdot F \cdot w_t$$

$$w_n = [w_{n=1} \ w_{n=2} \ \cdots \ w_{n=N}]^T$$

$$w_t = [w_{t=t_0} \ w_{t=t_0+1} \ \cdots \ w_{t=t_0+T-1}]^T$$

$$F = \begin{bmatrix} |f_{a,t_0}^{n=1} - f_{b,t_0-T+1}^{n=1}| & |f_{a,t_0+1}^{n=1} - f_{b,t_0-T+2}^{n=1}| & \cdots \\ |f_{a,t_0}^{n=2} - f_{b,t_0-T+1}^{n=2}| & \cdots & \cdots \\ \cdots & \cdots & |f_{a,t_0+T-1}^{n=N} - f_{b,t_0}^{n=N}| \end{bmatrix}$$

CC is a concatenation cost for representing a continuity between the candidate speech segment a1 and the candidate speech segment b2, T is the number of overlapping frames of the candidate speech segment a1 or the candidate speech segment b2, wt is the second weight corresponding to the acoustic feature of the t-th overlapping frame of the candidate speech segment a1 and the candidate speech segment b2, N is the number of acoustic features included in the candidate speech segment a1 or the candidate speech segment b2, wn is the first weight corresponding to the n-th acoustic feature of the candidate speech segment a1 and the candidate speech segment b2, $|\Delta f|$ is an acoustic distance metric of the n-th acoustic feature of the candidate speech segment a1 and the candidate speech segment b2, and F is the concatenation dissimilarity matrix corresponding to the candidate speech segment a1 and the candidate speech segment b2. Optionally, $|\Delta f|$ is an acoustic distance metric between the n-th acoustic feature of the candidate speech segment a1 and the n-th acoustic feature of the candidate speech segment b2.

Figure 1B:
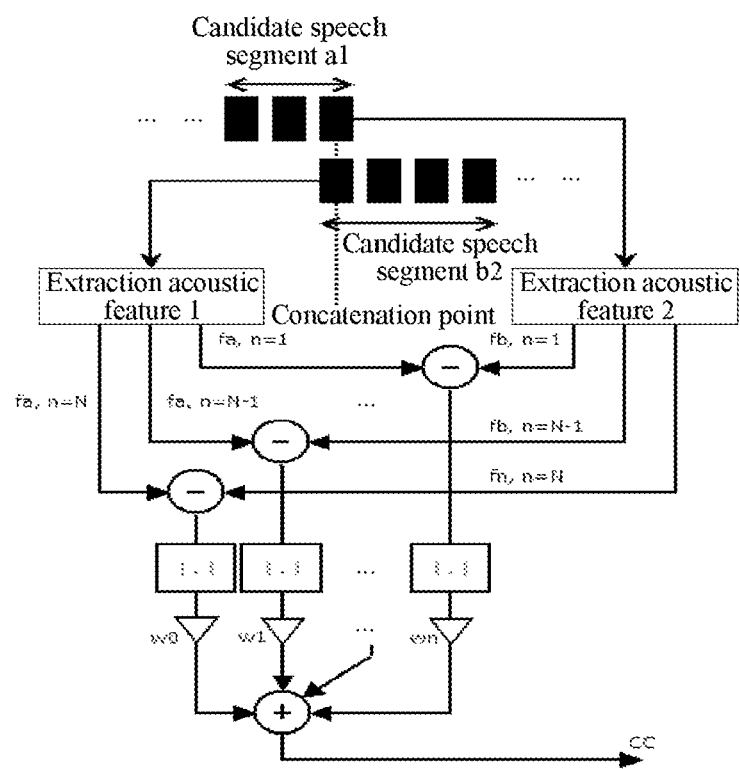
FIG. 1B is a schematic diagram of a speech synthesis method according to an embodiment.

FIG. 1B is a schematic diagram of a speech synthesis method according to an embodiment.

With reference to FIG. 1B, when the candidate speech segment a1 and the candidate speech segment b2 are concatenated, it is assumed that the candidate speech segment a1 and the candidate speech segment b2 have only one overlapping frame, the candidate speech segment a1 has N acoustic features (or N-dimension acoustic features) on the overlapping frame, and the candidate speech segment b2 correspondingly has N acoustic feature (or N-dimension acoustic features) text primitives w1 and text primitives w2 on the overlapping frame. Because mouth-shape transition and tone transition are different for different neighboring candidate speech segments when the user pronounces, first weights wn corresponding to n-th acoustic features corresponding to different neighboring candidate speech segments and a second weight wt corresponding to an acoustic feature of the t-th overlapping frame (it is assumed that there is only one overlapping frame in FIG. 1B) are also different. An acoustic distance metric of each acoustic feature of the candidate speech segment a1 and the candidate speech segment b2 and the corresponding first weight wn are multiplied and summated according to the number of acoustic features included in the candidate speech segment a1 or the candidate speech segment b2, and a concatenation cost is obtained by performing, according to the number of overlapping frames of the candidate speech segment a1 or the candidate speech segment b2, multiplication and summation on the multiplication and summation result about the first weight wn corresponding to the i-th overlapping frame and the corresponding second weight wt.

Wherein, by virtue of singular value matrix decomposition, a calculation formula for the concatenation cost may be deformed as follows:

$$CC = w_n^T \cdot F \cdot w_t$$
$$= w_n^T \cdot U\Sigma V \cdot w_t$$
$$= u \cdot \Sigma \cdot v$$

According to the foregoing several formulae, it can be seen that the server may calculate a concatenation dissimilarity matrix F in advance from training speech data (equivalent to a training sample), and calculates a first weight wn and a second weight wt according to the concatenation dissimilarity matrix F. That is, when the first weight wn is orthogonal to a first decomposed matrix U and the second weight wt is orthogonal to a second decomposed matrix V, namely when u=0 and v=0, the concatenation cost is lowest, and this first weight wn and this second weight wt are determined as target concatenation weights. In view of this, the disclosure provides the following embodiments.

Figure 2:
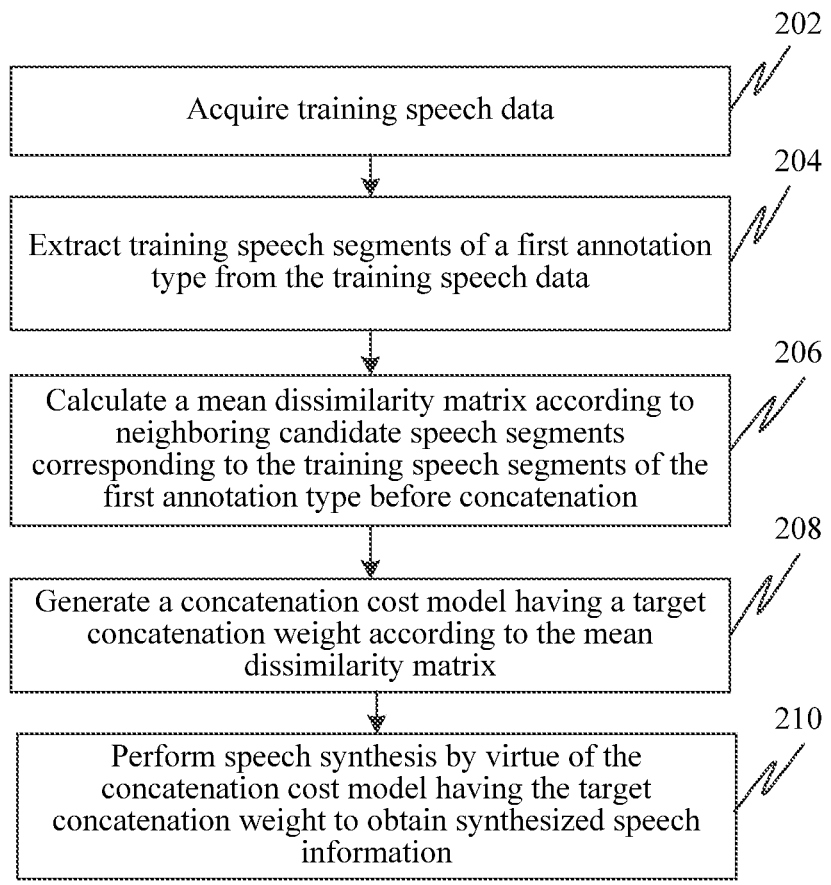
FIG. 2 is a flowchart of a speech synthesis method according to an embodiment.
Figure 3:
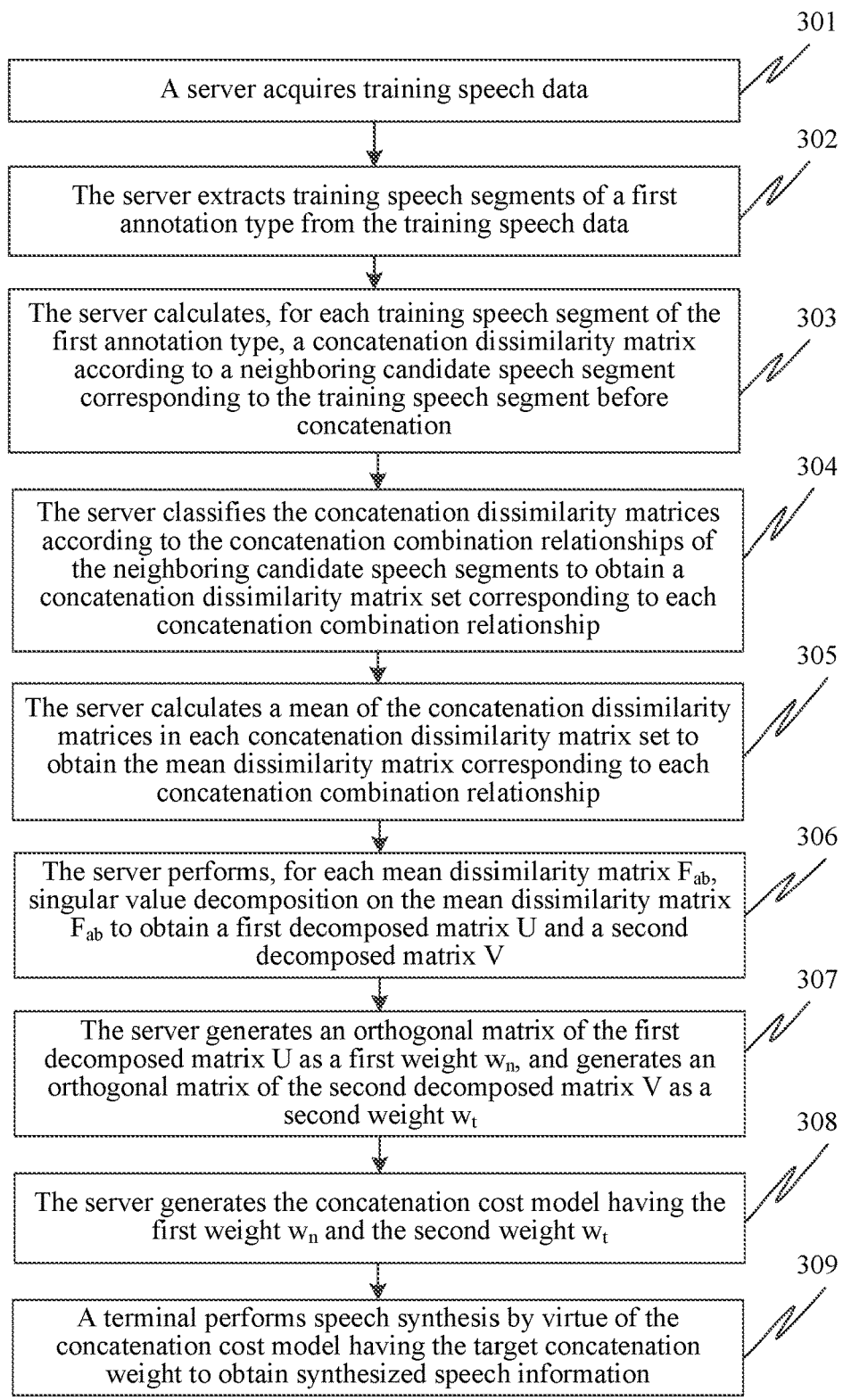
FIG. 3 is a flowchart of a speech synthesis method according to another embodiment.

FIG. 2 shows a flowchart of a speech synthesis method according to an embodiment. The speech synthesis method may be executed by a server or terminal having a speech processing capability. The speech synthesis method includes the following steps:

Step S202: Acquire training speech data.

Optionally, the server acquires to-be-trained training speech data, the training speech data including a plurality of training speech segments.

Step S204: Extract training speech segments of a first annotation type from the training speech data.

Optionally, the server determines at least two training speech segments included in the training speech data, annotation types of at least two training speech segments including a first annotation type and/or a second annotation type; and the server extracts x training speech segments of the first annotation type from at least two training speech segments, x being a positive integer.

Step S206: Calculate a mean dissimilarity matrix according to neighboring candidate speech segments corresponding to the training speech segments of the first annotation type before concatenation.

Optionally, after x training speech segments of the first annotation type are extracted, the server calculates, for each training speech segment of the first annotation type, a mean dissimilarity matrix according to a neighboring candidate speech segment corresponding to the training speech segment before concatenation. A mean of a plurality of groups of concatenation dissimilarity matrices belonging to a same type of concatenation combination relationship is calculated to obtain a mean dissimilarity matrix corresponding to this type of concatenation combination relationship.

Step S208: Generate a concatenation cost model having a target concatenation weight according to the mean dissimilarity matrix.

Optionally, the server calculates a concatenation cost model by virtue of a preset formula according to the obtained mean dissimilarity matrix, the concatenation cost model having a target concatenation weight.

Step S210: Perform speech synthesis by virtue of the concatenation cost model having the target concatenation weight to obtain synthesized speech information.

Optionally, when the server determines text information needing to be subjected to speech synthesis, the server performs speech synthesis on the determined text information by virtue of the concatenation cost model to obtain synthesized speech information.

In an actual speech synthesis process, the server transmits the generated concatenation cost model to the terminal, such that the terminal can be applied by adopting the concatenation cost model.

Optionally, the terminal acquires the generated concatenation cost model from the server, and when the terminal receives text information needing to be subjected to speech synthesis, the terminal performs speech synthesis on the input text information by virtue of the concatenation cost model to obtain synthesized speech information.

Step S202 to step S208 may be individually implemented as a model generating method. The model generating method is usually completed by a server and is used for generating a concatenation cost model having a target concatenation weight. Step S210 is a speech synthesis method. The speech synthesis method is usually completed by a server or a terminal and is used for performing speech synthesis on input text information by using the concatenation cost model generated in step S202 to step S208 to obtain synthesized speech information. The following describes an example that the server completes the model generating method and the terminal completes the speech synthesis method.

To sum up, according to the present embodiment, a mean dissimilarity matrix is calculated according to neighboring candidate speech segments corresponding to a plurality of training speech segments of a first annotation type before concatenation, and a concatenation cost model having a target concatenation weight is generated according to the mean dissimilarity matrix, wherein each mean dissimilarity matrix is used for representing a mean dissimilarity in acoustic features of a plurality of groups of neighboring candidate speech segments belonging to a same type of concatenation combination relationship. Because the concatenation cost model is calculated according to the mean dissimilarity matrix, the generated concatenation cost model has an accurate weight, thereby reducing manual adjustment times, and avoiding the situation in which the weight in the concatenation cost model needs to be manually adjusted for many times and the weight obtained finally is still not accurate enough.

FIGS. 3, 4A, 4B and 7 show flowcharts of a speech synthesis method according to another embodiment. The speech synthesis method includes the following steps:

Step S301: A server acquires training speech data.

Figure 4A:
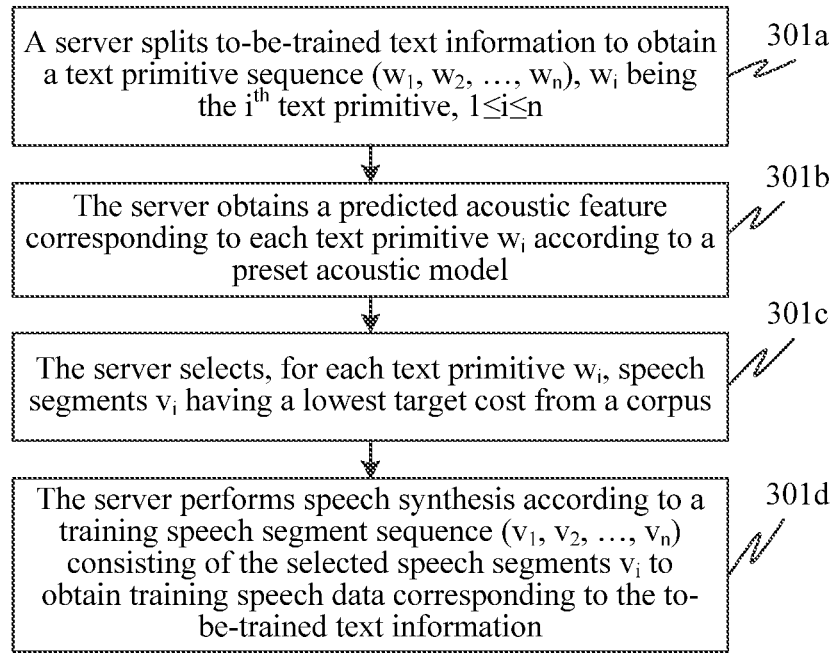
FIG. 4A is a flowchart of a speech synthesis method according to another embodiment.

Optionally, step S301 may be alternatively implemented as step S301a, step S301b, step S301c, and step S301d, as shown in FIG. 4A:

Step S301a: The server splits to-be-trained text information to obtain a text primitive sequence (w1, w2, . . . , wn), wi being the i-th text primitive, 1≤i≤n.

Optionally, the server splits to-be-trained text information based on phonemes or syllables to obtain a text primitive sequence (w1, w2, . . . , wn), wi being the i-th text primitive, 1≤i≤n.

Step S301b: The server obtains a predicted acoustic feature corresponding to each text primitive wi according to a preset acoustic model.

Optionally, the server outputs a preset acoustic model from a linguistic model corresponding to each text primitive wi, and outputs a predicted acoustic feature corresponding to each text primitive wi according to the preset acoustic model.

Step S301c: The server selects, for each text primitive wi, speech segments vi having a lowest target cost from a corpus.

Optionally, the server calculates, for each text primitive wi, a target cost of a candidate speech segment corresponding to each text primitive wi, and selects a speech segment viwt having a lowest target cost from a corpus.

Optionally, the server calculates, for each text primitive wi, the corresponding target cost based on the following formula:

$$TC_i = \sum_{n=1}^{N} w_n \cdot |f_{a,n} - f_{a',n}|,$$

wherein TCi is the target cost corresponding to the text primitive wi, wn is a preset first weight, and $|f_{a,n} - f_{a',n}|$ is an acoustic distance metric between the n-th acoustic feature in predicated acoustic features a' corresponding to the text primitive wi and the n-th acoustic feature of a candidate speech segment a.

Optionally, if the acoustic feature is expressed by an acoustic parameter value, the acoustic distance metric may be a Euclidean distance or difference absolute value.

Illustratively, if there are ten text primitives wi, the server correspondingly selects ten speech segments vi having the lowest target cost from the corpus.

Step S301d: The server performs speech synthesis according to a training speech segment sequence (v1, v2, . . . , vn) consisting of the selected speech segments vi to obtain the training speech data corresponding to the to-be-trained text information.

Referring back to FIG. 3, in step S302, the server extracts training speech segments of a first annotation type from the training speech data.

Figure 4B:
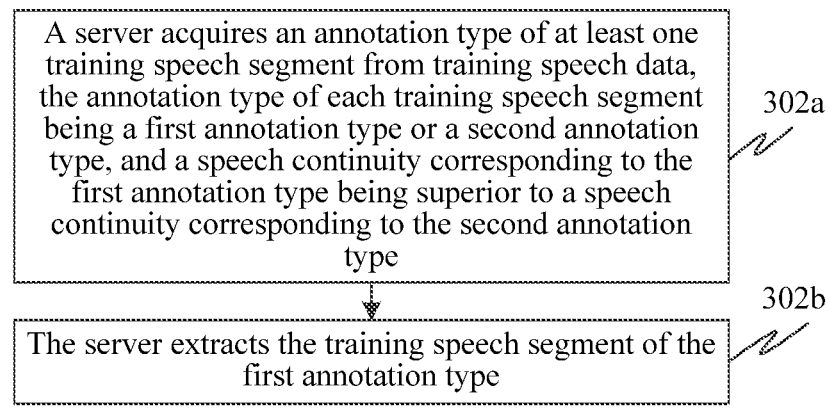
FIG. 4B is a flowchart of a speech synthesis method according to another embodiment.

Optionally, step S302 may be alternatively implemented as step S302a and step S302b, as shown in FIG. 4B:

Step S302a: The server acquires an annotation type of at least one training speech segment from the training speech data, the annotation type of each training speech segment being a first annotation type or a second annotation type, and a speech continuity corresponding to the first annotation type being superior to a speech continuity corresponding to the second annotation type.

Step S302b: The server extracts the training speech segment of the first annotation type.

Optionally, the training speech segment of the first annotation type or the second annotation type is annotated by performing artificial audiometry on the training speech data. When the server extracts the training speech segment of the first annotation type, the annotation type of each training speech segment is acquired. The server extracts the training speech segment of the first annotation type from the training speech data.

Referring back to FIG. 3, in step S303, the server calculates, for each training speech segment of the first annotation type, a concatenation dissimilarity matrix according to a neighboring candidate speech segment corresponding to the training speech segment before concatenation.

Optionally, there is a plurality of training speech segments such as hundreds of training speech segments, thousands of training speech segments, or over ten thousands of training speech segments. The server calculates, for each training speech segment of the first annotation type, a concatenation dissimilarity matrix corresponding to this training speech segment according to a neighboring candidate speech segment corresponding to this training speech segment before concatenation.

The step of calculating, by the server, a concatenation dissimilarity matrix includes:

1) The server acquires, for each training speech segment of the first annotation type, a candidate speech segment a and a candidate speech segment b corresponding to the training speech segment before concatenation.

2) The server acquires a first group of acoustic features corresponding to each overlapping frame of the candidate speech segment a and a second group of acoustic features corresponding to each overlapping frame of the candidate speech segment b.

Optionally, there may be one or more overlapping frames of the candidate speech segment a and the candidate speech segment b.

Figure 5:
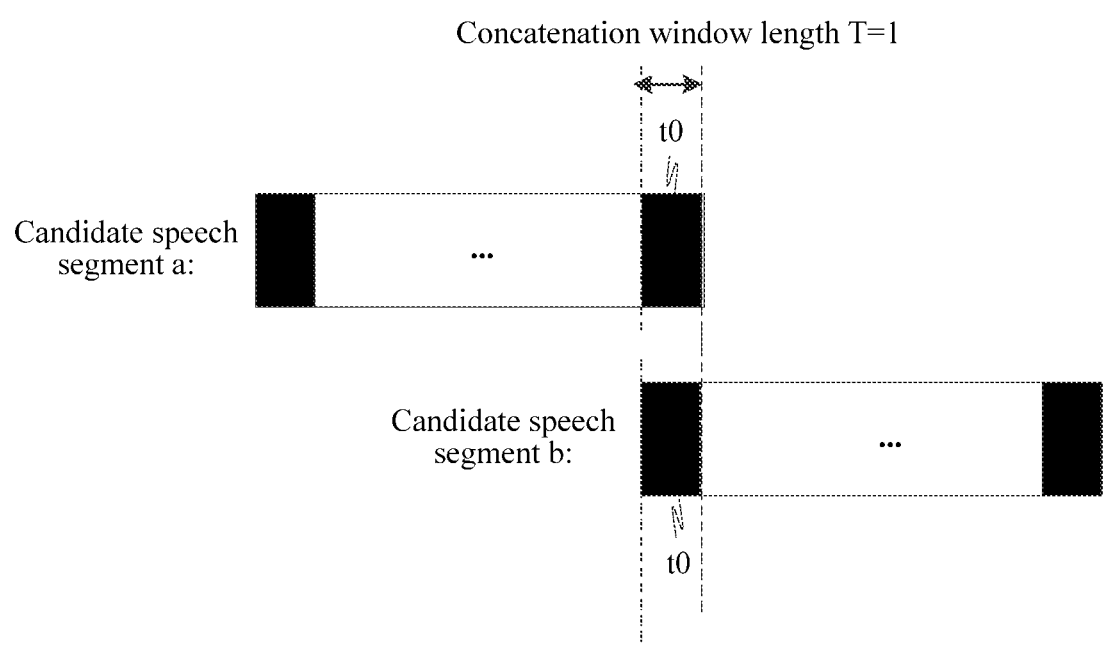
FIG. 5 is a schematic diagram of a speech synthesis method according to another embodiment.

FIG. 5 is a schematic diagram of a speech synthesis method according to another embodiment. Illustratively, as shown in FIG. 5, it is assumed that the current time is t0, the time corresponding to the last frame of the candidate speech segment a is t0 and the time corresponding to the first frame of the candidate speech segment b is t0, and when a concatenation window length is T=1 frame, the last frame of the candidate speech segment a overlaps with the first frame of the candidate speech segment b, that is, "a(t0)+b(t0)." In other words, in a concatenation process, the candidate speech segment a and the candidate speech segment b have one overlapping frame.

Figure 6:
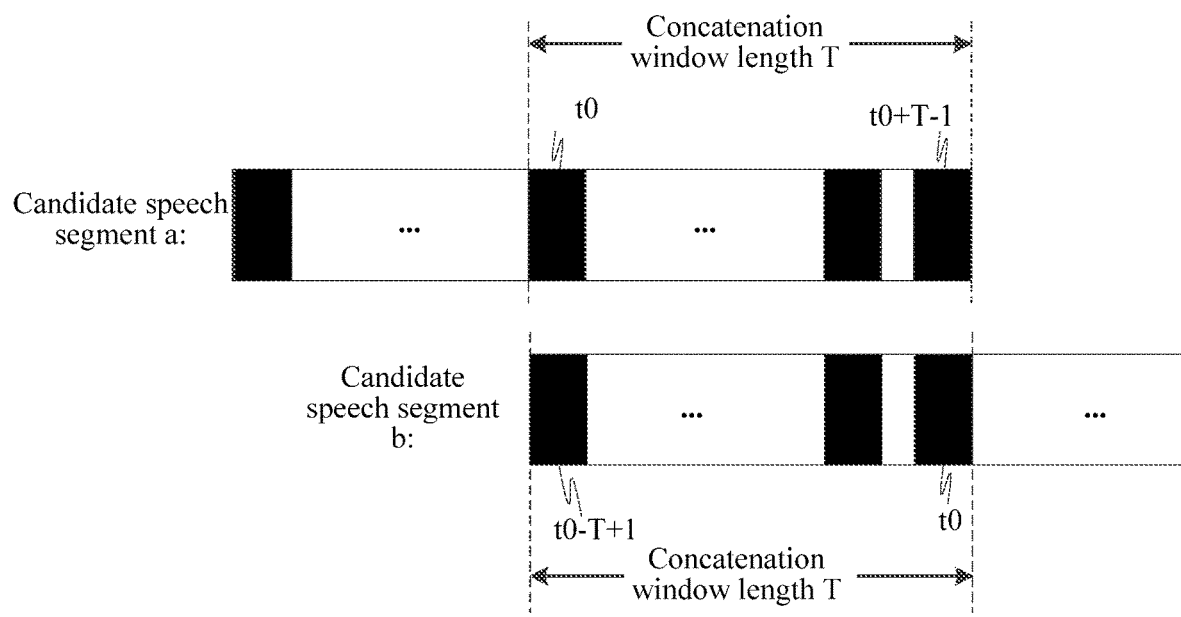
FIG. 6 is a schematic diagram of a speech synthesis method according to another embodiment.

FIG. 6 is a schematic diagram of a speech synthesis method according to another embodiment. Illustratively, as shown in FIG. 6, it is assumed that the current time is t0, the time corresponding to the last frame of the candidate speech segment a is t0 and the time corresponding to the first frame of the candidate speech segment b is t0, and when a concatenation window length T takes any value, the t0th frame to the (t0+T−1)th frame of the candidate speech segment a overlap with the (t0−T+1)th frame to the t0th frame of the candidate speech segment b, that is, "a(t0: t0+T−1)+b(t0−T+1: t0)." The number T of overlapping frames is not limited in the embodiment. Illustratively, the number T of the overlapping frames is 20.

Optionally, each overlapping frame of the candidate speech segment a is corresponding to a first group of acoustic features, the first group of acoustic features including n acoustic features (or n-dimension acoustic features). Each overlapping frame of the candidate speech segment b is corresponding to a second group of acoustic features, the second group of acoustic features including n acoustic features (or n-dimension acoustic features). The acoustic feature is any one or any combination of fundamental frequency and spectrum features, a first-order change rate and high-order change rate of a fundamental frequency, a first-order change rate and high-order change rate of a spectrum, signal energy, or a signal zero-crossing rate.

3) The server calculates the concatenation dissimilarity matrix F according to the first group of acoustic features and the second group of acoustic features based on the following formula:

$$F = \begin{bmatrix} |f_{a,t_0}^{n=1} - f_{b,t_0-T+1}^{n=1}| & |f_{a,t_0+1}^{n=1} - f_{b,t_0-T+2}^{n=1}| & \cdots \\ |f_{a,t_0}^{n=2} - f_{b,t_0-T+1}^{n=2}| & \cdots & \cdots \\ \cdots & \cdots & |f_{a,t_0+T-1}^{n=N} - f_{b,t_0}^{n=N}| \end{bmatrix},$$

wherein F is the concatenation dissimilarity matrix corresponding to the candidate speech segment a and the candidate speech segment b, the n-th row and the t-th column in the concatenation dissimilarity matrix represent an acoustic distance metric of the n-th acoustic feature of the t-th overlapping frame in the candidate speech segment a and the n-th acoustic feature of the (t−T+1)th overlapping frame in the candidate speech segment b, $f_{a,t}$ is the n-th acoustic feature corresponding to the t-th overlapping frame of the candidate speech segment a, and $f_{b,t-T+1}$ is the n-th acoustic feature corresponding to the (t−T+1)th overlapping frame of the candidate speech segment b.

Referring back to FIG. 3, in step S304, the server classifies the concatenation dissimilarity matrices according to the concatenation combination relationships of the neighboring candidate speech segments to obtain a concatenation dissimilarity matrix set corresponding to each concatenation combination relationship.

Wherein, the concatenation dissimilarity matrix set includes m concatenation dissimilarity matrices belonging to a same concatenation combination relationship, m being a positive integer.

Optionally, a neighboring candidate speech segment corresponding to each measuring speech segment can calculate a concatenation dissimilarity matrix. If there are ten thousand measuring speech segments, ten thousand concatenation dissimilarity matrices may be calculated.

The candidate speech segments are of different phoneme or syllable types. If a training speech segment is obtained by concatenation in a manner that speech segments of type a precede speech segments of type b, the concatenation combination relationship corresponding to the training speech segment is: speech segments of type a precede speech segments of type b.

Illustratively, if the candidate speech segments are divided by phonemes, for example, the candidate speech segment a is a speech segment corresponding to a phonetic alphabet "y" and the candidate speech segment b is a speech segment corresponding to a phonetic alphabet "i," a combination relationship formed between the phonetic alphabet "y" and the phonetic alphabet "i" is a concatenation combination relationship. For the concatenation combination relationship formed between the phonetic alphabet "y" and the phonetic alphabet "i," there may be hundreds of concatenation dissimilarity matrices, which are classified into a concatenation dissimilarity matrix set corresponding to the concatenation combination relationship "y+i."

Step S305: The server calculates a mean of the concatenation dissimilarity matrices in each concatenation dissimilarity matrix set to obtain the mean dissimilarity matrix corresponding to each concatenation combination relationship.

Illustratively, when the concatenation dissimilarity matrix set is Fab, i, a mean of all concatenation dissimilarity matrices in Fab, i is calculated to obtain a mean dissimilarity matrix Fab corresponding to the concatenation combination relationship between the candidate speech segment a and the candidate speech segment b.

Step S306: The server performs, for each mean dissimilarity matrix Fab, singular value decomposition on the mean dissimilarity matrix Fab to obtain a first decomposed matrix U and a second decomposed matrix V.

The server performs, for each mean dissimilarity matrix Fab, singular value decomposition Fab=UΣV on the mean dissimilarity matrix Fab to obtain a first decomposed matrix U and a second decomposed matrix V.

Wherein, ab represents a concatenation combination relationship in which speech segments of type a precede speech segments of type b. Illustratively, this type refers to a phoneme type.

Step S307: The server generates an orthogonal matrix of the first decomposed matrix U as a first weight wn, and generates an orthogonal matrix of the second decomposed matrix V as a second weight wt.

Optionally, the server defines a concatenation cost based on the following formula:

$$CC = w_n^T \cdot F \cdot w_t$$
$$= w_n^T \cdot U\Sigma V \cdot w_t$$
$$= u \cdot \Sigma \cdot v$$

According to the foregoing formula, it can be seen that when the first weight wn is orthogonal to the first decomposed matrix U and the second weight wt is orthogonal to the second decomposed matrix V, namely when u=0 and v=0, the concatenation cost is lowest, and this first weight wn and this second weight wt are determined as target concatenation weights.

Step S308: The server generates the concatenation cost model having the first weight wn and the second weight wt.

The server generates the concatenation cost model as follows:

$$CC = \sum_{t'=1}^{T} w_t \cdot \left(\sum_{n=1}^{N} w_n \cdot |\Delta f|\right),$$

wherein CC is a concatenation cost for representing a continuity between the neighboring candidate speech segments, T is the number of overlapping frames of the neighboring candidate speech segment, wt is the second weight corresponding to the acoustic feature of the t-th overlapping frame of the neighboring candidate speech segment, N is the number of acoustic features included in each candidate speech segment, wn is the first weight corresponding to the n-th acoustic feature of the neighboring candidate speech segment, and |Δf| is an acoustic distance metric of the n-th acoustic feature of the neighboring candidate speech segment.

Step S309: The terminal performs speech synthesis by virtue of the concatenation cost model having the target concatenation weight to obtain synthesized speech information.

To sum up, according to the present embodiment, a mean of concatenation dissimilarity matrices in each concatenation dissimilarity matrix set is calculated to obtain a mean dissimilarity matrix corresponding to each concatenation combination relationship, and singular value decomposition is performed on each mean dissimilarity matrix to determine a first weight and a second weight, to make the calculated weights more accurate.

Figure 7:
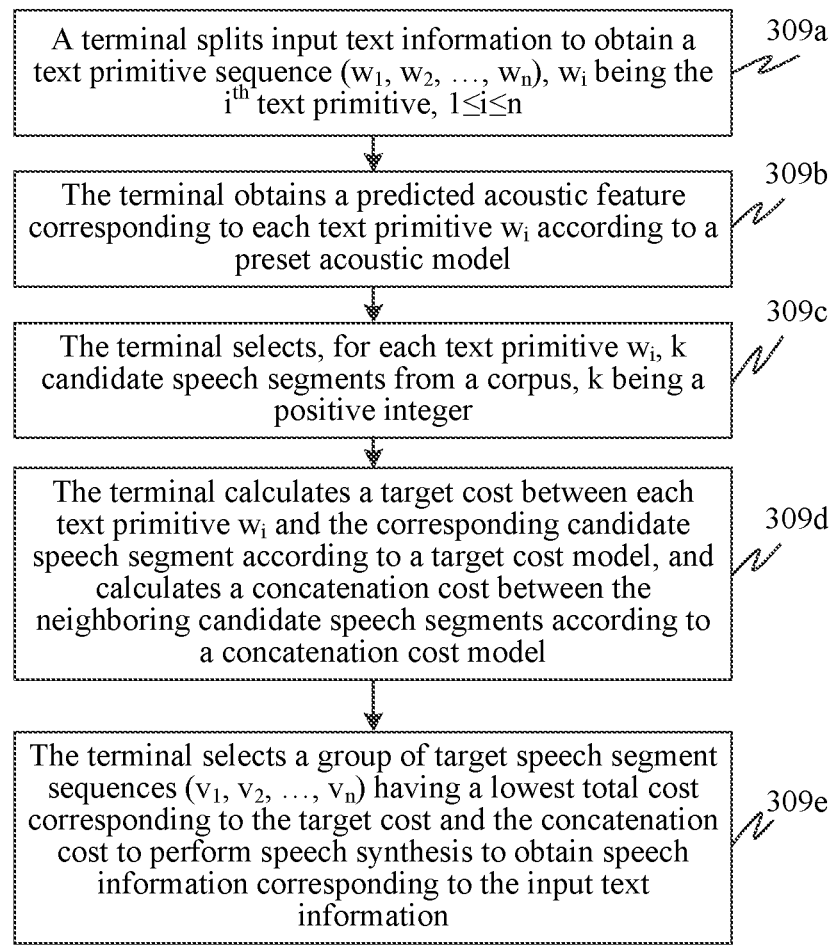
FIG. 7 is a flowchart of a speech synthesis method according to another embodiment.

In a possible embodiment, or in the foregoing embodiment, the concatenation cost model obtained by the server may be transmitted to the terminal for application in an actual speech synthesis process. In this case, step S309 may be alternatively implemented as step S309a, step S309b, step S309c, step S309d, and step S309e, as shown in FIG. 7:

Step S309a: The terminal splits input text information to obtain a text primitive sequence (w1, w2, . . . , wn), wi being the i-th text primitive, 1≤i≤n.

Optionally, input text information is text information input by a user, such as a news text or a novel text. The terminal splits the input text information to obtain a text primitive sequence (w1, w2, . . . , wn), wi being the i-th text primitive, 1≤i≤n.

Step S309b: The terminal obtains a predicted acoustic feature corresponding to each text primitive wi according to a preset acoustic model.

Step S309c: The terminal selects, for each text primitive wi, k candidate speech segments from a corpus, k being a positive integer.

Step S309d: The terminal calculates a target cost between each text primitive wi and the corresponding candidate speech segment according to a concatenation cost model, and calculates a concatenation cost between the neighboring candidate speech segments according to the concatenation cost model.

Optionally, the terminal calculates a target cost between each text primitive wi and the corresponding candidate speech segment according to a concatenation cost model based on the following formula:

$$TC = \sum_{n=1}^{N} w_n \cdot |f_{a,n} - f_{a',n}|,$$

wherein TC is a target cost corresponding to an input text primitive a, wn is a first weight corresponding to the n-th acoustic feature of a candidate speech segment in the concatenation cost model generated by using the model generating method, and $|f_{a,n} - f_{a',n}|$ is an acoustic distance metric of the n-th acoustic feature of the candidate speech segment a and a predicated acoustic feature a'.

Optionally, the terminal calculates the concatenation cost between the neighboring candidate speech segments according to the concatenation cost model based on the following formula:

$$CC_T = \sum_{t=t_0}^{t_0+T-1} w_t \cdot \left(\sum_{n=1}^{N} w_n \cdot |f_{a,t} - f_{b,t-T+1}|\right),$$

wherein CCT is the concatenation cost corresponding to the candidate speech segment a and the neighboring candidate speech segment b, wt is a second weight corresponding to an acoustic feature of the t-th overlapping frame of the candidate speech segment a or the candidate speech segment b, wn is the first weight corresponding to the n-th acoustic feature of the candidate speech segment a or the candidate speech segment b, and $|f_{a,t} - f_{b,t-T+1}|$ is an acoustic distance metric of the n-th acoustic feature of the t-th overlapping frame of the candidate speech segment a and the (t−T+1)th overlapping frame of the candidate speech segment b.

Step S309e: The terminal selects a group of target speech segment sequences (v1, v2, . . . , vn) having a lowest total cost corresponding to the target cost and the concatenation cost to perform speech synthesis to obtain speech information corresponding to the input text information.

Optionally, the terminal selects, from all candidate concatenation manners, a group of target speech segment sequences (v1, v2, . . . , vn) having a lowest total cost corresponding to the target cost and the concatenation cost to perform speech synthesis to obtain speech information corresponding to the input text information.

Optionally, the target cost and the concatenation cost corresponding to all the candidate concatenation manners can form a matrix, a path having values descending from left to right in this matrix can be obtained through a dynamic planning algorithm, and various speech segments corresponding to this path constitute a group of target speech segment sequences having the lowest total cost.

To sum up, according to the present embodiment, a terminal calculates a target cost between each text primitive wi and the corresponding candidate speech segment according to a concatenation cost model, calculates a concatenation cost between the neighboring candidate speech segments according to the concatenation cost model, and selects a group of target speech segment sequences (v1, v2, . . . , vn) having a lowest total cost corresponding to the target cost and the concatenation cost to perform speech synthesis to obtain speech information corresponding to input text information. Both the factor of the target cost and the impact of the concatenation cost are taken into consideration. Because the concatenation cost is used for representing a continuity of the neighboring candidate speech segments after concatenation, synthesized speech information has a better continuity effect.

Figure 8:
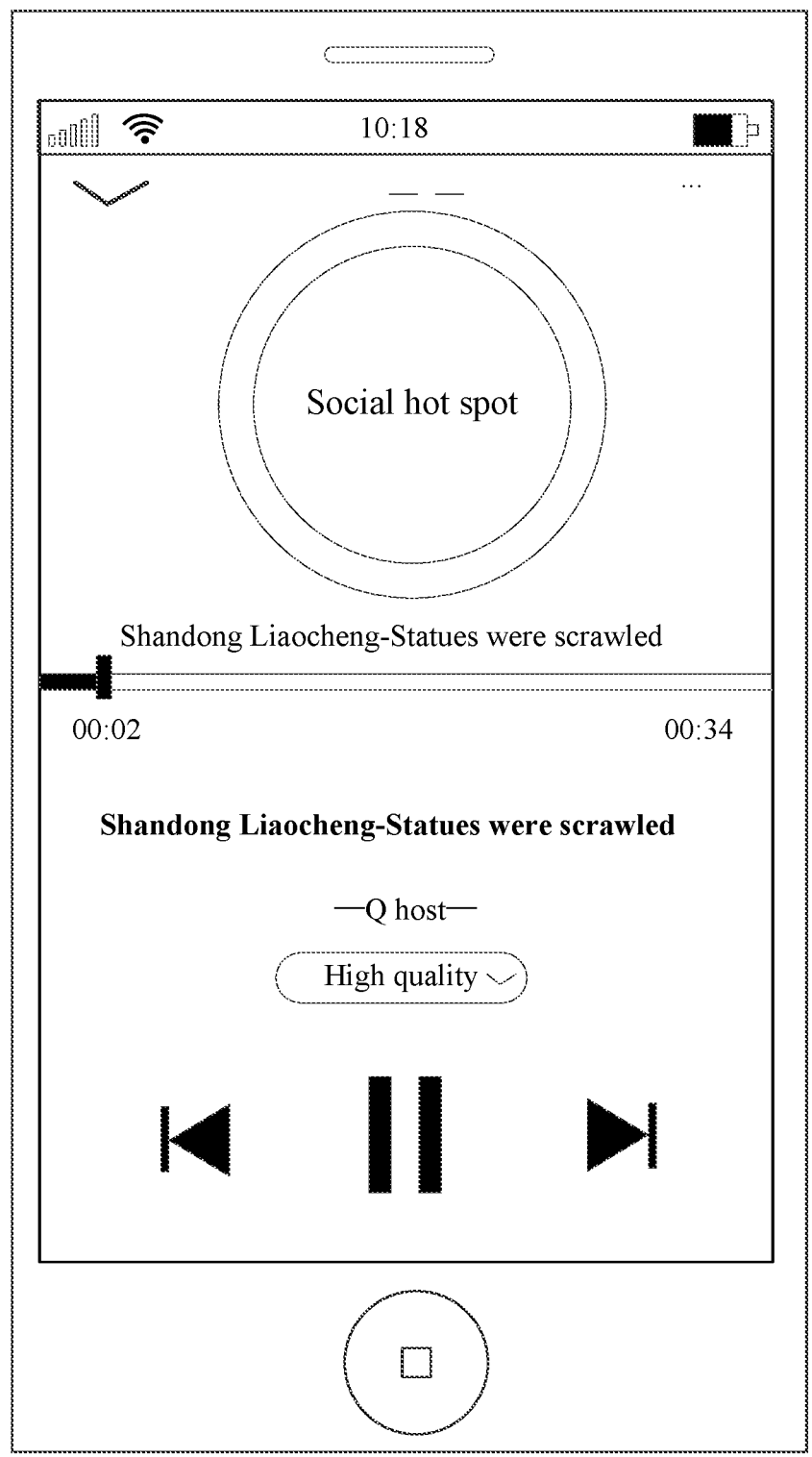
FIG. 8 is an interface diagram of a speech synthesis method according to another embodiment.

FIG. 8 is an interface diagram of a speech synthesis method according to another embodiment. Referring to FIG. 8, in a schematic example, the speech synthesis method is applied to an application program such as "QQ FM" of a terminal. When a user inputs a news text or a novel text into an application program having a speech synthesis function, the application program will synthesize speech information corresponding to the input news text or novel text.

The followings are apparatus embodiments in the disclosure. Details that are not elaborated in the apparatus embodiments may refer to the foregoing method embodiments in a one-to-one correspondence to the apparatus embodiments.

Figure 9:
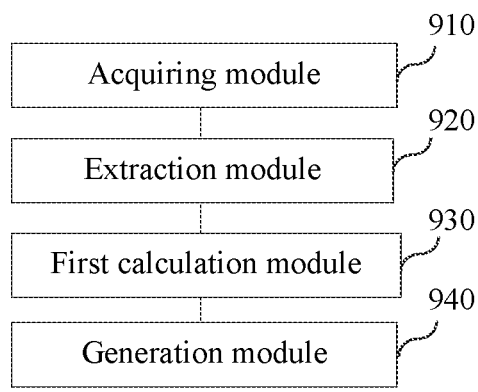
FIG. 9 is a structure diagram of a module generating apparatus according to an embodiment.

FIG. 9 shows a structure diagram of a module generating apparatus according to an embodiment.

The apparatus may be implemented as all or part of a server through software, hardware or combination thereof. The module generating apparatus includes an acquiring module 910, an extraction module 920, a first calculation module 930, and a generation module 940.

The acquiring module 910 is configured to acquire training speech data, the training speech data being speech data obtained by concatenating speech segments having a lowest target cost.

The extraction module 920 is configured to extract training speech segments of a first annotation type from the training speech data, the first annotation type being used for annotating that a speech continuity of the training speech segment is superior to a preset condition.

The first calculation module 930 is configured to calculate a mean dissimilarity matrix according to neighboring candidate speech segments corresponding to the training speech segments of the first annotation type before concatenation, the mean dissimilarity matrix corresponding to one type of concatenation combination relationship, and the mean dissimilarity matrix being used for representing a mean dissimilarity in acoustic features of a plurality of groups of neighboring candidate speech segments belonging to a same type of concatenation combination relationship.

The generation module 940 is configured to generate a concatenation cost model having a target concatenation weight according to the mean dissimilarity matrix, the concatenation cost model being corresponding to one type of concatenation combination relationship.

Figure 10:
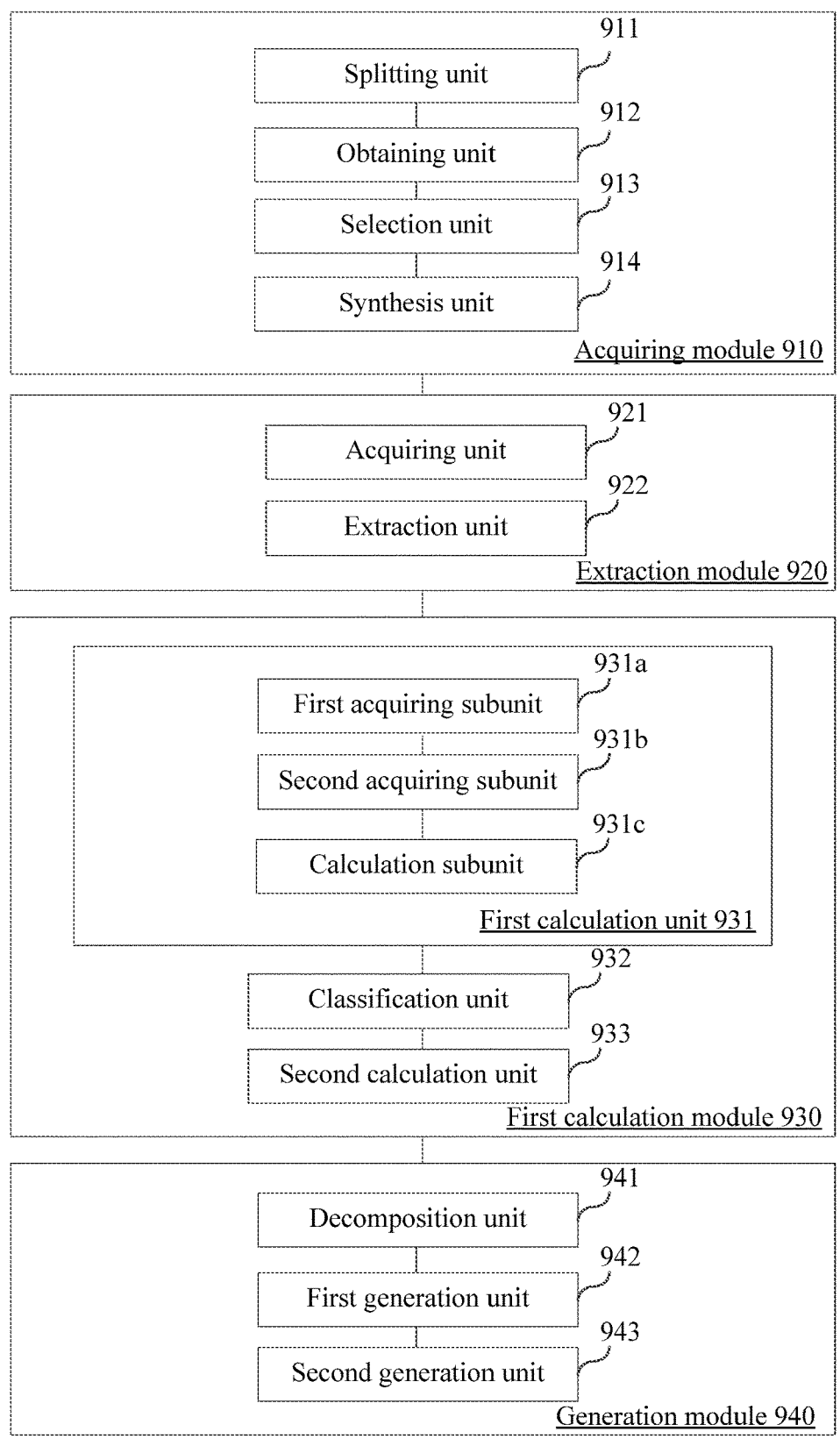
FIG. 10 is a structure diagram of a module generating apparatus according to another embodiment.

FIG. 10 shows a structure diagram of a module generating apparatus according to another embodiment. The module generating apparatus includes the acquiring module 910, the extraction module 920, the first calculation module 930, and the generation module 940 of FIG. 9.

The generation module 940 includes a decomposition unit 941, a first generation unit 942 and a second generation unit 943.

The decomposition unit 941 is configured to perform, for each mean dissimilarity matrix Fab, singular value decomposition Fab=UΣV on the mean dissimilarity matrix Fab to obtain a first decomposed matrix U and a second decomposed matrix V.

The first generation unit 942 is configured to generate an orthogonal matrix of the first decomposed matrix U as a first weight wn, and generate an orthogonal matrix of the second decomposed matrix V as a second weight wt.

The second generation unit 943 is configured to generate the concatenation cost model having the first weight wn and the second weight wt.

Wherein, ab represents a concatenation combination relationship in which speech segments of type a precede speech segments of type b.

The second generation unit 943 is configured to generate the concatenation cost model as follows:

$$CC = \sum_{t=1}^{T} w_t \cdot \left( \sum_{n=1}^{N} w_n \cdot |\Delta f| \right),$$

wherein CC is a concatenation cost for representing a continuity between the neighboring candidate speech segments, T is the number of overlapping frames of the neighboring candidate speech segment, wt is the second weight corresponding to the acoustic feature of the t-th overlapping frame of the neighboring candidate speech segment, N is the number of acoustic features included in each candidate speech segment, wn is the first weight corresponding to the n-th acoustic feature of the neighboring candidate speech segment, and |Δf| is an acoustic distance metric of the n-th acoustic feature of the neighboring candidate speech segment.

The first calculation module 930 includes a first calculation unit 931, a classification unit 932 and a second calculation unit 933.

The first calculation unit 931 is configured to calculate, for each training speech segment of the first annotation type, a concatenation dissimilarity matrix according to the neighboring candidate speech segment corresponding to the training speech segment before concatenation.

The classification unit 932 is configured to classify the concatenation dissimilarity matrices according to the concatenation combination relationships of the neighboring candidate speech segments to obtain a concatenation dissimilarity matrix set corresponding to each concatenation combination relationship, the concatenation dissimilarity matrix set including a plurality of concatenation dissimilarity matrices belonging to a same concatenation combination relationship.

The second calculation unit 933 is configured to calculate a mean of the concatenation dissimilarity matrices in each concatenation dissimilarity matrix set to obtain the mean dissimilarity matrix corresponding to each concatenation combination relationship.

The first calculation unit 931 includes a first acquiring subunit 931a, a second acquiring subunit 931b and a calculation subunit 931c.

The first acquiring subunit 931a is configured to acquire, for each training speech segment of the first annotation type, a candidate speech segment a and a candidate speech segment b corresponding to the training speech segment before concatenation.

The second acquiring subunit 931b is configured to acquire a first group of acoustic features corresponding to an overlapping frame of the candidate speech segment a and a second group of acoustic features corresponding to an overlapping frame of the candidate speech segment b, the first group of acoustic features including n acoustic features, and the second group of acoustic features including n acoustic features.

The calculation subunit 931c is configured to calculate the concatenation dissimilarity matrix F based on the following formula according to the first group of acoustic features and the second group of acoustic features:

$$F = \begin{bmatrix} |f_{a,t_0}^{n=1} - f_{b,t_0-T+1}^{n=1}| & |f_{a,t_0+1}^{n=1} - f_{b,t_0-T+2}^{n=1}| & \cdots \\ |f_{a,t_0}^{n=2} - f_{b,t_0-T+1}^{n=2}| & \cdots & \cdots \\ \cdots & \cdots & |f_{a,t_0+T-1}^{n=N} - f_{b,t_0}^{n=N}| \end{bmatrix},$$

wherein F is the concatenation dissimilarity matrix corresponding to the candidate speech segment a and the candidate speech segment b, the n-th row and the t-th column in the concatenation dissimilarity matrix represent an acoustic distance metric of the n-th acoustic feature of the t-th overlapping frame in the candidate speech segment a and the n-th acoustic feature of the (t−T+1)th overlapping frame in the candidate speech segment b, $f_{a,t}$ is the n-th acoustic feature corresponding to the t-th overlapping frame of the candidate speech segment a, and $f_{b,t-T+1}$ is the n-th acoustic feature corresponding to the (t−T+1)th overlapping frame of the candidate speech segment b.

The extraction module 920 includes an acquiring unit 921 and an extraction unit 922.

The acquiring unit 921 is configured to acquire an annotation type of at least one training speech segment in the training speech data, the annotation type of each training speech segment being the first annotation type or a second annotation type, a speech continuity corresponding to the first annotation type being superior to that corresponding to the second annotation type.

The extraction unit 922 is configured to extract the training speech segments of the first annotation type.

The acquiring module 910 includes a splitting unit 911, an obtaining unit 912, a selection unit 913, and a synthesis unit 914.

The splitting unit 911 is configured to split to-be-trained text information to obtain a text primitive sequence (w1, w2, ..., wn), wi being the i-th text primitive, 1≤i≤n.

The obtaining unit 912 is configured to obtain a predicted acoustic feature corresponding to each text primitive wi according to a preset acoustic model.

The selection unit 913 is configured to select, for each text primitive wi, speech segments vi having the lowest target cost from a corpus, the target cost being used for representing a similarity between a predicted acoustic feature corresponding to the text primitive wi and the acoustic feature of the candidate speech segment.

The synthesis unit 914 is configured to perform speech synthesis according to a training speech segment sequence (v1, v2, ..., vn) consisting of the selected speech segments vi to obtain the training speech data corresponding to the to-be-trained text information.

Figure 11:
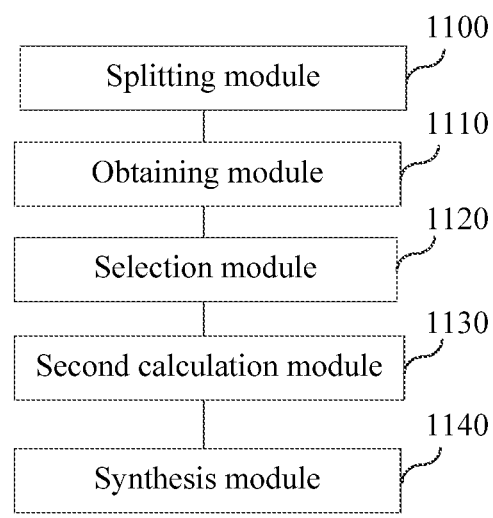
FIG. 11 is a structure diagram of a speech synthesis apparatus according to an embodiment.

FIG. 11 shows a structure diagram of a speech synthesis apparatus according to an embodiment. The speech synthesis apparatus adopts the concatenation cost model provided in the embodiment shown in FIG. 9 or FIG. 10. The speech synthesis apparatus includes a splitting module 1100, an obtaining module 1110, a selection module 1120, a second calculation module 1130, and a synthesis module 1140.

The splitting module 1100 is configured to split input text information to obtain a text primitive sequence (w1, w2, ..., wn), wi being the i-th text primitive, 1≤i≤n.

The obtaining module 1110 is configured to obtain a predicted acoustic feature corresponding to each text primitive wi according to a preset acoustic model.

The selection module 1120 is configured to select, for each text primitive wi, a plurality of candidate speech segments from a corpus.

The second calculation module 1130 is configured to calculate a target cost between each text primitive wi and the corresponding candidate speech segment according to a target cost model, and calculate a concatenation cost between the neighboring candidate speech segments according to a concatenation cost model.

The synthesis module 1140 is configured to select a group of target speech segment sequences (v1, v2, ..., vn) having a lowest total cost corresponding to the target cost and the concatenation cost to perform speech synthesis to obtain speech information corresponding to the input text information.

Figure 12:
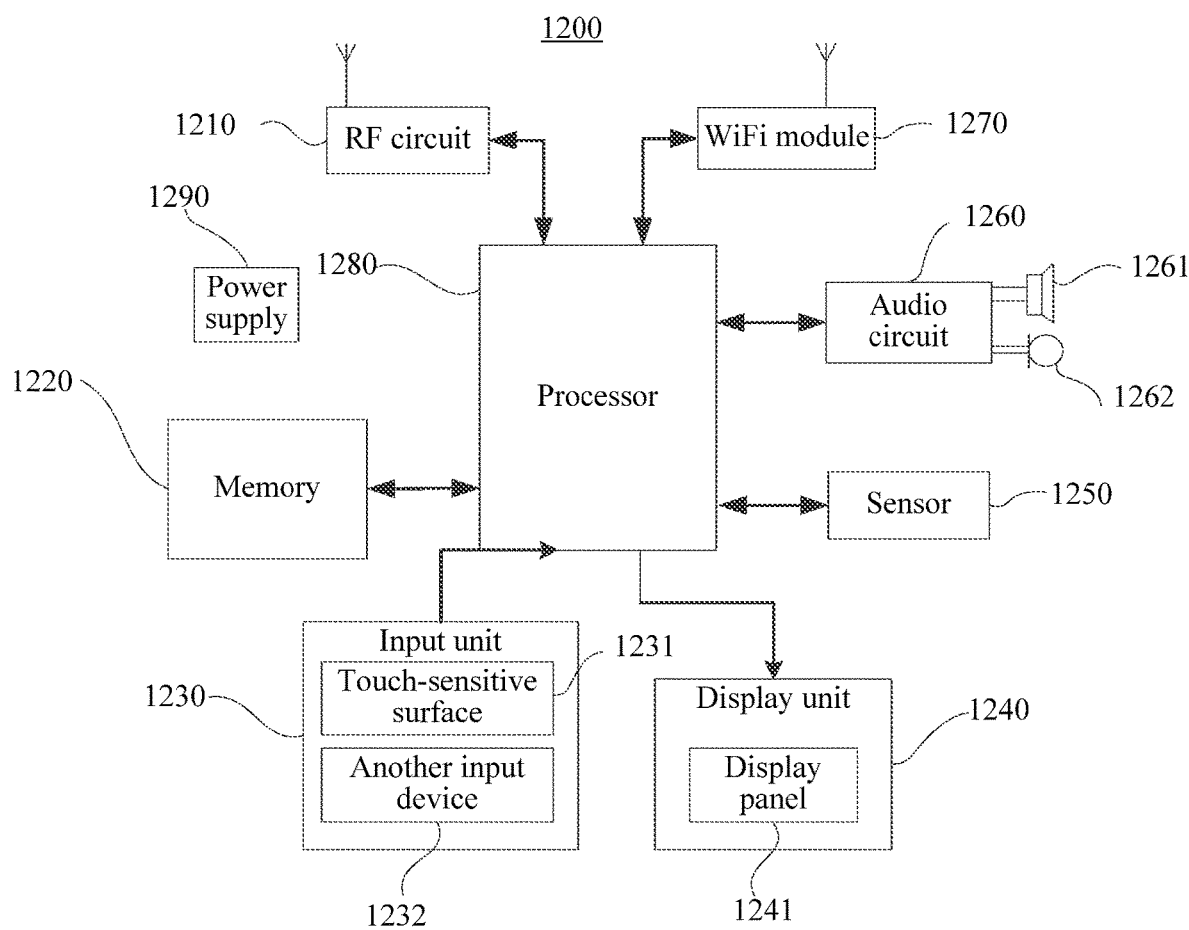
FIG. 12 is a block diagram of a terminal according to an embodiment.

FIG. 12 shows a block diagram of a terminal according to an embodiment. The terminal device 1200 may include components such as an RF (Radio Frequency) circuit 1210, a memory 1220 including one or more computer readable storage media, an input unit 1230, a display unit 1240, a sensor 1250, an audio circuit 1260, a WIFI (wireless fidelity) module 1270, a processor 1280 including one or more processing cores, and a power supply 1290. A person skilled in the art may understand that the structure of the device shown in 12 does not constitute a limitation to the device, and the terminal may include more or fewer components than those shown in the figure, or some components may be combined, or a different component deployment may be used. The RF circuit 1210 may be configured to receive and send signals during an information receiving and sending process or a call process. The RF circuit receives downlink information from a base station, then delivers the downlink information to one or more processors 1280 for processing, and sends related uplink data to the base station. The RF circuit 1210 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 1210 may also communicate with a network and another device by wireless communication.

The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like. The memory 1220 may be configured to store a software program and module. The processor 1280 runs the software program and module stored in the memory 1220, to implement various functional applications and data processing. The memory 1220 may mainly include a program storage area and a data storage area. The program storage area may store an operating system, an application program used by at least one function (such as a sound playback function and an image display function), and the like. The data storage area may store data (such as audio data and an address book) created according to use of the terminal 1200, and the like. In addition, the memory 1220 may include a high speed random access memory, and may also include a non-volatile memory, such as at least one magnetic disk storage device, a flash memory, or another volatile solid-state storage device. Correspondingly, the memory 1220 may further include a memory controller, to provide access of the processor 1280 and the input unit 1230 to the memory 1220.

The input unit 1230 may be configured to receive input digit or character information, and generate a keyboard, mouse, joystick, optical, or track ball signal input related to the user setting and function control. The input unit 1230 may include a touch-sensitive surface 1231 and another input device 1232. The touch-sensitive surface 1231, also referred to as a touch screen or a touch panel, may collect a touch operation of a user on or near the touch-sensitive surface (such as an operation of a user on or near the touch-sensitive surface 1231 by using any suitable object or accessory, such as a finger or a stylus), and drive a corresponding connection apparatus according to a preset program. Optionally, the touch-sensitive surface 1231 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1280. Moreover, the touch controller can receive and execute an instruction sent from the processor 1280. In addition, the touch-sensitive surface 1231 may be a resistive, capacitive, infrared, or surface sound wave type touch-sensitive surface 1231. In addition to the touch-sensitive surface 1231, the input unit 1230 may further include another input device 1232. The other input device 1232 may include, but is not limited to, one or more of a physical keyboard, a functional key (such as a volume control key or a switch key), a track ball, a mouse, and a joystick.

The display unit 1240 may be configured to display information input by the user or information provided for the user, and various graphical user interfaces of the terminal 120. The display unit 1240 may include a display panel 1241. Optionally, the display panel 1241 may be configured by using a liquid crystal display (LCD), an organic light-emitting diode (OLED), or the like. Further, the touch-sensitive surface 1231 may cover the display panel 1241. After detecting a touch operation on or near the touch-sensitive surface 1231, the touch-sensitive surface 1231 transfers the touch operation to the processor 1280, to determine a type of a touch event. Then, the processor 1280 provides corresponding visual output on the display panel 1241 according to the type of the touch event. Although, in FIG. 12, the touch-sensitive surface 1231 and the display panel 1241 are used as two separate parts to implement input and output functions, in some embodiments, the touch-sensitive surface 1231 and the display panel 1241 may be integrated to implement the input and output functions.

The terminal 1200 may further include at least one sensor 1250 such as an optical sensor, a motion sensor, and other sensors. The optical sensor may include an ambient light sensor and a proximity sensor. The ambient light sensor may adjust luminance of the display panel 1241 according to brightness of the ambient light. The proximity sensor may switch off the display panel 1241 and/or backlight when the terminal 1200 is moved to the ear. As one type of the motion sensor, a gravity acceleration sensor may detect a value of acceleration at each direction (which may be triaxial), may detect a value and a direction of the gravity when being static, and may be configured to identify an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor, which can be configured in the terminal 1200 is not described herein again.

The audio circuit 1260, a loudspeaker 1261, and a microphone 1262 may provide audio interfaces between the user and the terminal 1200. The audio circuit 1260 may transmit an electrical signal, which is converted from received audio data, to the loudspeaker 1261. The loudspeaker 1261 converts the electrical signal into a sound signal and outputs the sound signal. On the other side, the microphone 1262 converts a collected sound signal into an electrical signal. After receiving the electrical signal, the audio circuit 1260 converts the electrical signal into audio data, and then outputs the audio data. After being processed by the processor 1280, the audio data is sent through the RF circuit 1210 to, for example, another terminal or the audio data is output to the memory 1220 for further processing. The audio circuit 1260 may further include an earplug jack, to provide communication between a peripheral earphone and the terminal 1200.

The WiFi is based on a short distance wireless transmission technology. The terminal 1200 may help, by using the WiFi module 1270, the user to receive and send e-mails, browse a webpage, access streaming media, and so on, which provides wireless broadband Internet access for the user. Although FIG. 12 shows the WiFi circuit 1270, it may be understood that the wireless communications unit is not a necessary component of the terminal 1200, and the wireless communications unit may be omitted as long as the scope of the essence of the disclosure is not changed.

The processor 1280 is the control center of the terminal, and is connected to various parts of the terminal by using various interfaces and lines. By running or executing the software program and/or module stored in the memory 1220, and invoking data stored in the memory 1220, the processor 1280 performs various functions and data processing of the terminal 1200, thereby performing overall monitoring on the terminal. Optionally, the processor 1280 may include one or more processing cores. Optionally, the processor 1280 may integrate an application processor and a modulator and demodulator, in which the application processor mainly processes an operating system, a user interface, and an application program and the like, and the modulator and demodulator mainly processes wireless communication. It may be understood that the foregoing modem may also not be integrated into the processor 1280.

The terminal 1200 further includes the power supply 1290 (such as a battery) for supplying power to the components. The power supply may be logically connected to the processor 1280 by using a power management system, thereby implementing functions such as charging, discharging and power consumption management by using the power management system. The power supply 1290 may further include one or more of a direct current or alternating current power supply, a re-charging system, a power failure detection circuit, a power supply converter or inverter, a power supply state indicator, and any other components.

The terminal 1200 may further include a camera, a Bluetooth module, and the like, which are not further described herein. In the present embodiment, the memory 1202 stores at least one instruction, at least one program, a code set or an instruction set. The at least one instruction, the at least one program, the code set or the instruction set is loaded and executed by the processor 1280 to implement the speech synthesis method according to each method embodiment.

Figure 13:
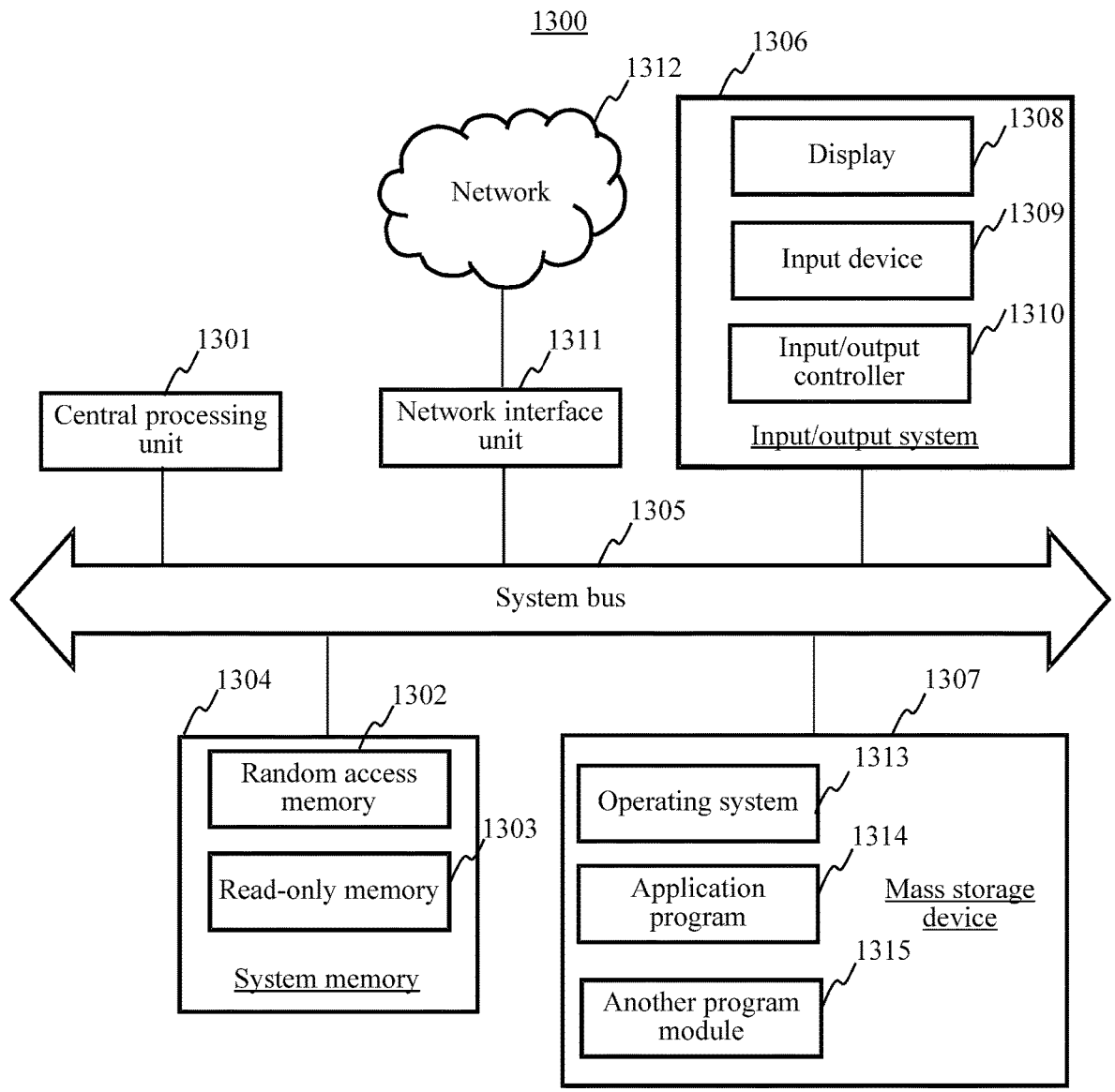
FIG. 13 is a block diagram of a server according to an embodiment.

FIG. 13 shows a block diagram of a terminal according to an embodiment. A server 1300 includes a central processing unit (CPU) 1301, a system memory 1304 including a random access memory (RAM) 1302 and a read-only memory (ROM) 1303, and a system bus 1305 connecting the system memory 1304 and the CPU 1301. The server 1300 further includes a basic input/output system (I/O system) 1306 used for transmitting information between components in a computer, and a mass storage device 1307 used for storing an operating system 1313, an application program 1314, and another program module 1315.

The basic I/O system 1306 includes a display 1308 used for displaying information, and an input device 1309, such as a mouse and a keyboard, used for a user to input information. The display 1308 and the input device 1309 are connected to an input/output controller 1310 of the system bus 1305, to be connected to the CPU 1301. The basic I/O system 1306 may further include the input/output controller 1310, to receive and process input of multiple other devices, such as the keyboard, the mouse, or an electronic stylus. Similarly, the input and output controller 1310 further provides an output to a display screen, a printer or another type of output device.

The mass storage device 1307 is connected to a mass storage controller of the system bus 1305, to be connected to the CPU 1301. The mass storage device 1307 and an associated computer readable medium provide non-volatile storage to the server 1300. That is, the mass storage device 1307 may include a computer readable medium, such as a hard disk or a CD-ROM drive.

The computer readable medium may include a computer storage medium and a communication medium. The computer storage medium includes volatile and non-volatile media, and removable and non-removable media implemented by using any method or technology used for storing information such as a computer readable instruction, a data structure, a program module or other data. The computer storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices. A person skilled in the art may know that the computer storage medium is not limited to the foregoing. The system memory 1304 and the mass storage device 1307 may be called a memory.

According to the embodiments, the server 1300 may further be connected to a remote computer on a network through a network, such as Internet. That is, the server 1300 may be connected to a network 1312 by being connected to a network interface unit 1311 on the system bus 1305, or, may be connected to a network of another type or a remote computer system by using the network interface unit 1311. In the present embodiment, the memory stores at least one instruction, at least one program, a code set or an instruction set. The at least one instruction, the at least one program, the code set or the instruction set is loaded and executed by the processor to implement the model generating method and/or the speech synthesis method according to each method embodiment.

The sequence numbers of the preceding embodiments are for description purpose but do not indicate the preference of the embodiments.

A person of ordinary skill in the art may understand that all or some of the steps of the model generating method and the speech synthesis method of the foregoing embodiments may be implemented by using hardware, or may be implemented by a program instructing relevant hardware. The program may be stored in a computer-readable storage medium. The above-mentioned storage medium may be a read-only memory, a magnetic disk, an optical disc, or the like. Or, the storage medium stores at least one instruction, at least one program, a code set or an instruction set. The at least one instruction, the at least one program, the code set or the instruction set is loaded and executed by the processor to implement the model generating method and/or the speech synthesis method according to each method embodiment.

As is traditional in the field of the inventive concepts, the example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

The foregoing descriptions are embodiments, but are not intended to limit the disclosure. Any modification, equivalent replacement, or improvement made within the spirit and principle of the disclosure shall fall within the protection scope of the disclosure.

What is claimed is:

1. A method being performed by at least one processor, the method comprising:

acquiring training speech data by concatenating speech segments having a lowest target cost among candidate concatenation solutions;

extracting training speech segments of a first annotation type, from the training speech data, the first annotation type being used for annotating that a speech continuity of a respective one of the training speech segments is superior to a preset condition;

calculating a mean dissimilarity matrix, based on neighboring candidate speech segments corresponding to the training speech segments before concatenation, the mean dissimilarity matrix representing a mean dissimilarity in acoustic features of groups of the neighboring candidate speech segments belonging to a same type of concatenation combination relationship; and generating a concatenation cost model having a target concatenation weight, based on the mean dissimilarity matrix, the concatenation cost model corresponding to the same type of concatenation combination relationship.

2. The method according to claim 1, wherein the generating the concatenation cost model comprises:

for each mean dissimilarity matrix Fab, performing a singular value decomposition Fab=UΣV on each mean dissimilarity matrix Fab to obtain a first decomposed matrix U and a second decomposed matrix V;

generating an orthogonal matrix of the first decomposed matrix U, as a first weight wn;

generating an orthogonal matrix of the second decomposed matrix V, as a second weight wt; and generating the concatenation cost model having the first weight wn and the second weight wt, wherein ab represents a concatenation combination relationship in which speech segments of type a precede speech segments of type b.

3. The method according to claim 2, wherein the generating the concatenation cost model having the first weight wn and the second weight wt comprises:

generating the concatenation cost model, based on a following equation:

$$CC = \sum_{t=1}^{T} w_t \cdot \left( \sum_{n=1}^{N} w_n \cdot |\Delta f| \right),$$

wherein CC is a concatenation cost for representing a continuity between the neighboring candidate speech segments, T is a number of overlapping frames of the neighboring candidate speech segments, wt is the second weight corresponding to an acoustic feature of a t-th overlapping frame of the neighboring candidate speech segments, N is a number of acoustic features comprised in each of the neighboring candidate speech segments, wn is the first weight corresponding to an n-th acoustic feature of the neighboring candidate speech segments, and |Δf| is an acoustic distance metric of the n-th acoustic feature of the neighboring candidate speech segments.

4. The method according to claim 1, wherein the calculating the mean dissimilarity matrix comprises:

calculating, for each of the training speech segments of the first annotation type, a concatenation dissimilarity matrix, based on one of the neighboring candidate speech segments corresponding to a respective one of the training speech segments before concatenation;

classifying the concatenation dissimilarity matrix, based on concatenation combination relationships of the neighboring candidate speech segments, to obtain a concatenation dissimilarity matrix set corresponding to each of the concatenation combination relationships, the concatenation dissimilarity matrix set comprising m concatenation dissimilarity matrices belonging to a same one of the concatenation combination relationships, and m being a positive integer; and calculating a mean of the m concatenation dissimilarity matrices in the concatenation dissimilarity matrix set corresponding to each of the concatenation combination relationships, to obtain the mean dissimilarity matrix corresponding to each of the concatenation combination relationships.

5. The method according to claim 4, wherein the calculating, for each of the training speech segments of the first annotation type, the concatenation dissimilarity matrix comprises:

acquiring, for each of the training speech segments of the first annotation type, a candidate speech segment a and a candidate speech segment b corresponding to the respective one of the training speech segments before concatenation;

acquiring a first group of acoustic features corresponding to an overlapping frame of the candidate speech segment a and a second group of acoustic features corresponding to an overlapping frame of the candidate speech segment b, the first group of acoustic features comprising n acoustic features, and the second group of acoustic features comprising n acoustic features; and calculating the concatenation dissimilarity matrix F, based on a following formula, according to the first group of acoustic features and the second group of acoustic features:

$$F = \begin{bmatrix} |f_{a,t_0}^{n=1} - f_{b,t_0-T+1}^{n=1}| & |f_{a,t_0+1}^{n=1} - f_{b,t_0-T+2}^{n=1}| & \cdots \\ |f_{a,t_0}^{n=2} - f_{b,t_0-T+1}^{n=2}| & \cdots & \cdots \\ \cdots & \cdots & |f_{a,t_0+T-1}^{n=N} - f_{b,t_0}^{n=N}| \end{bmatrix},$$

wherein F is the concatenation dissimilarity matrix corresponding to the candidate speech segment a and the candidate speech segment b, an n-th row and a t-th column in the concatenation dissimilarity matrix represent an acoustic distance metric of an n-th acoustic feature of a t-th overlapping frame in the candidate speech segment a and an n-th acoustic feature of a (t−T+1)th overlapping frame in the candidate speech segment b, $f_{a,t}$ is the n-th acoustic feature of the t-th overlapping frame in the candidate speech segment a, and $f_{b,t-T+1}$ is the n-th acoustic feature of the (t−T+1)th overlapping frame in the candidate speech segment b.

6. The method according to claim 1, wherein the extracting the training speech segments comprises:

acquiring an annotation type of at least one training speech segment in the training speech data, the annotation type being the first annotation type or a second annotation type, and a speech continuity corresponding to the first annotation type being superior to that corresponding to the second annotation type; and extracting the training speech segments of the first annotation type, from the training speech data.

7. The method according to claim 1, wherein the acquiring the training speech data comprises:
splitting to-be-trained text information to obtain a text primitive sequence w1, w2, ..., wn, wi being an i-th text primitive, 1≤i≤n;
obtaining a predicted acoustic feature corresponding to each text primitive wi, based on a preset acoustic model;
selecting, for each text primitive wi, speech segments vi having the lowest target cost, from a corpus, the lowest target cost representing a similarity between the predicted acoustic feature and an acoustic feature of a candidate speech segment; and
performing speech synthesis, based on a training speech segment sequence v1, v2, ..., vn consisting of the speech segments vi that are selected, to obtain the training speech data corresponding to the to-be-trained text information.

8. The method according to claim 1, further comprising:
splitting input text information to obtain a text primitive sequence w1, w2, ..., wn, wi being an i-th text primitive, 1≤i≤n;
obtaining a predicted acoustic feature corresponding to each text primitive wi, based on a preset acoustic model;
selecting, for each text primitive wi, k candidate speech segments vi, from a corpus, k being a positive integer;
calculating a target cost between each text primitive wi and a corresponding one of the k candidate speech segments, based on a target cost model, the target cost representing a similarity between the predicted acoustic feature corresponding to the text primitive wi and an acoustic feature of the corresponding one of the k candidate speech segments;
calculating a concatenation cost between the neighboring candidate speech segments, based on the concatenation cost model, the concatenation cost representing a continuity between the neighboring candidate speech segments; and
selecting a group of target speech segment sequences v1, v2, ..., vn having a lowest total cost corresponding to the target cost and the concatenation cost, to perform speech synthesis to obtain speech information corresponding to the input text information.

9. An apparatus comprising:
at least one memory configured to store computer program code; and
at least one processor configured to access the at least one memory and operate according to the computer program code, the computer program code comprising:
acquiring code configured to cause the at least one processor to acquire training speech data by concatenating speech segments having a lowest target cost among candidate concatenation solutions;
extraction code configured to cause the at least one processor to extract training speech segments of a first annotation type, from the training speech data, the first annotation type being used for annotating that a speech continuity of a respective one of the training speech segments is superior to a preset condition;
first calculation code configured to cause the at least one processor to calculate a mean dissimilarity matrix, based on neighboring candidate speech segments corresponding to the training speech segments before concatenation, the mean dissimilarity matrix representing a mean dissimilarity in acoustic features of groups of the neighboring candidate speech segments belonging to a same type of concatenation combination relationship; and
generation code configured to cause the at least one processor to generate a concatenation cost model having a target concatenation weight, based on the mean dissimilarity matrix, the concatenation cost model corresponding to the same type of concatenation combination relationship.

10. The apparatus according to claim 9, wherein the generation code is further configured to cause the at least one processor to:
perform, for each mean dissimilarity matrix Fab, a singular value decomposition Fab=UΣV on each mean dissimilarity matrix Fab to obtain a first decomposed matrix U and a second decomposed matrix V;
generate an orthogonal matrix of the first decomposed matrix U, as a first weight wn;
generate an orthogonal matrix of the second decomposed matrix V, as a second weight wt; and
generate the concatenation cost model having the first weight wn and the second weight wt,
wherein ab represents a concatenation combination relationship in which speech segments of type a precede speech segments of type b.

11. The apparatus according to claim 10, wherein the generation code is further configured to cause the at least one processor to generate the concatenation cost model, based on a following equation:

$$CC = \sum_{t=1}^{T} w_t \cdot \left( \sum_{n=1}^{N} w_n \cdot |\Delta f| \right),$$

wherein CC is a concatenation cost for representing a continuity between the neighboring candidate speech segments, T is a number of overlapping frames of the neighboring candidate speech segments, wt is the second weight corresponding to an acoustic feature of a t-th overlapping frame of the neighboring candidate speech segments, N is a number of acoustic features comprised in each of the neighboring candidate speech segments, wn is the first weight corresponding to an n-th acoustic feature of the neighboring candidate speech segments, and |Δf| is an acoustic distance metric of the n-th acoustic feature of the neighboring candidate speech segments.

12. The apparatus according to claim 9, wherein the first calculation code is further configured to cause the at least one processor to:
calculate, for each of the training speech segments of the first annotation type, a concatenation dissimilarity matrix, based on one of the neighboring candidate speech segments corresponding to a respective one of the training speech segments before concatenation;
classify the concatenation dissimilarity matrix, based on concatenation combination relationships of the neighboring candidate speech segments, to obtain a concatenation dissimilarity matrix set corresponding to each of the concatenation combination relationships, the concatenation dissimilarity matrix set comprising m concatenation dissimilarity matrices belonging to a same one of the concatenation combination relationships, m being a positive integer; and calculate a mean of the m concatenation dissimilarity matrices in the concatenation dissimilarity matrix set corresponding to each of the concatenation combination relationships, to obtain the mean dissimilarity matrix corresponding to each of the concatenation combination relationships.

13. The apparatus according to claim 12, wherein the first calculation code is further configured to cause the at least one processor to:
acquire, for each of the training speech segments of the first annotation type, a candidate speech segment a and a candidate speech segment b corresponding to the respective one of the training speech segments before concatenation;
acquire a first group of acoustic features corresponding to an overlapping frame of the candidate speech segment a and a second group of acoustic features corresponding to an overlapping frame of the candidate speech segment b, the first group of acoustic features comprising n acoustic features, and the second group of acoustic features comprising n acoustic features; and
calculate the concatenation dissimilarity matrix F, based on a following formula, according to the first group of acoustic features and the second group of acoustic features:

$$F = \begin{bmatrix} |f_{a,t_0}^{n=1} - f_{b,t_0-T+1}^{n=1}| & |f_{a,t_0+1}^{n=1} - f_{b,t_0-T+2}^{n=1}| & \cdots \\ |f_{a,t_0}^{n=2} - f_{b,t_0-T+1}^{n=2}| & \cdots & \cdots \\ \cdots & \cdots & |f_{a,t_0+T-1}^{n=N} - f_{b,t_0}^{n=N}| \end{bmatrix},$$

wherein F is the concatenation dissimilarity matrix corresponding to the candidate speech segment a and the candidate speech segment b, an n-th row and a t-th column in the concatenation dissimilarity matrix represent an acoustic distance metric of an n-th acoustic feature of a t-th overlapping frame in the candidate speech segment a and an n-th acoustic feature of a (t−T+1)th overlapping frame in the candidate speech segment b, $f_{a,t}$ is the n-th acoustic feature of the t-th overlapping frame in the candidate speech segment a, and $f_{b,t-T+1}$ is the n-th acoustic feature of the (t−T+1)th overlapping frame in the candidate speech segment b.

14. The apparatus according to claim 9, wherein the extraction code is further configured to cause the at least one processor to:
acquire an annotation type of at least one training speech segment in the training speech data, the annotation type being the first annotation type or a second annotation type, and a speech continuity corresponding to the first annotation type being superior to that corresponding to the second annotation type; and
extract the training speech segments of the first annotation type, from the training speech data.

15. The apparatus according to claim 9, wherein the acquiring code is further configured to cause the at least one processor to:
split to-be-trained text information to obtain a text primitive sequence w1, w2, . . . , wn, wi being an i-th text primitive, 1≤i≤n;
obtain a predicted acoustic feature corresponding to each text primitive wi, based on a preset acoustic model;
select, for each text primitive wi, speech segments vi having the lowest target cost, from a corpus, the lowest target cost representing a similarity between the predicted acoustic feature and an acoustic feature of a candidate speech segment; and
perform speech synthesis, based on a training speech segment sequence v1, v2, . . . , vn consisting of the speech segments vi that are selected, to obtain the training speech data corresponding to the to-be-trained text information.

16. The apparatus according to claim 9, wherein the computer code further comprises:
splitting code configured to cause the at least one processor to split input text information to obtain a text primitive sequence w1, w2, . . . , wn, wi being an i-th text primitive, 1≤i≤n;
obtaining code configured to cause the at least one processor to obtain a predicted acoustic feature corresponding to each text primitive wi, based on a preset acoustic model;
selection code configured to cause the at least one processor to select, for each text primitive wi, k candidate speech segments vi, from a corpus, k being a positive integer;
second calculation code configured to cause the at least one processor to:
calculate a target cost between each text primitive wi and a corresponding one of the k candidate speech segments, based on a target cost model, the target cost representing a similarity between the predicted acoustic feature corresponding to the text primitive wi and an acoustic feature of the corresponding one of the k candidate speech segments;
calculate a concatenation cost between the neighboring candidate speech segments, based on the concatenation cost model, the concatenation cost representing a continuity between the neighboring candidate speech segments; and
synthesis code configured to select a group of target speech segment sequences v1, v2, . . . , vn having a lowest total cost corresponding to the target cost and the concatenation cost, to perform speech synthesis to obtain speech information corresponding to the input text information.

17. The apparatus according to claim 9, wherein the apparatus comprises a server.

18. The apparatus according to claim 9, wherein the apparatus comprises a terminal.

19. A non-transitory computer-readable storage medium storing instructions that cause a processor to:
acquire training speech data by concatenating speech segments having a lowest target cost among candidate concatenation solutions;
extract training speech segments of a first annotation type, from the training speech data, the first annotation type being used for annotating that a speech continuity of a respective one of the training speech segments is superior to a preset condition;
calculate a mean dissimilarity matrix, based on neighboring candidate speech segments corresponding to the training speech segments before concatenation, the mean dissimilarity matrix representing a mean dissimilarity in acoustic features of groups of the neighboring candidate speech segments belonging to a same type of concatenation combination relationship; and
generate a concatenation cost model having a target concatenation weight, based on the mean dissimilarity matrix, the concatenation cost model corresponding to the same type of concatenation combination relationship.

20. The non-transitory computer-readable storage medium according to claim 19, wherein the instructions further cause the processor to:
- for each mean dissimilarity matrix Fab, perform a singular value decomposition Fab=UΣV on each mean dissimilarity matrix Fab to obtain a first decomposed matrix U and a second decomposed matrix V;
- generate an orthogonal matrix of the first decomposed matrix U, as a first weight wn;
- generate an orthogonal matrix of the second decomposed matrix V, as a second weight wt; and
- generate the concatenation cost model having the first weight wn and the second weight wt,
- wherein ab represents a concatenation combination relationship in which speech segments of type a precede speech segments of type b.

* * * * *